(12) United States Patent
Ling et al.

(10) Patent No.: US 11,431,930 B2
(45) Date of Patent: Aug. 30, 2022

(54) ARRAY SENSOR, METHOD FOR FORMING AND OPERATING THE SAME

(71) Applicant: SHANGHAI OXI TECHNOLOGY CO., LTD, Shanghai (CN)

(72) Inventors: Yan Ling, Shanghai (CN); Hong Zhu, Shanghai (CN)

(73) Assignee: Shanghai OxiTech. Co, Ltd, Shanghai (CN)

( * ) Notice: Subject to any disclaimer, the term of this patent is extended or adjusted under 35 U.S.C. 154(b) by 348 days.

(21) Appl. No.: 16/487,334

(22) PCT Filed: Jul. 16, 2018

(86) PCT No.: PCT/CN2018/095744
§ 371 (c)(1),
(2) Date: Aug. 20, 2019

(87) PCT Pub. No.: WO2020/014808
PCT Pub. Date: Jan. 23, 2020

(65) Prior Publication Data
US 2021/0337145 A1    Oct. 28, 2021

(51) Int. Cl.
*H04N 5/372* (2011.01)
*H04N 5/359* (2011.01)
*H04N 5/376* (2011.01)

(52) U.S. Cl.
CPC ........... *H04N 5/372* (2013.01); *H04N 5/3597* (2013.01); *H04N 5/3765* (2013.01)

(58) Field of Classification Search
CPC ..... H04N 5/372; H04N 5/3765; H04N 5/3597
(Continued)

(56) References Cited

U.S. PATENT DOCUMENTS

| | | | |
|---|---|---|---|
| 2006/0139469 A1* | 6/2006 | Yokota | H04N 5/347 348/E3.02 |
| 2012/0181439 A1 | 7/2012 | Cao | |

(Continued)

FOREIGN PATENT DOCUMENTS

| | | |
|---|---|---|
| CN | 102695003 A | 9/2012 |
| CN | 102099704 B | 7/2013 |

(Continued)

OTHER PUBLICATIONS

International Search Report from PCT/CN2018/095744 dated Jul. 16, 2018.

*Primary Examiner* — Lin Ye
*Assistant Examiner* — Chan T Nguyen
(74) *Attorney, Agent, or Firm* — Adsero IP

(57) ABSTRACT

An array sensor and a method for forming and operating the same are provided. The array sensor includes: a sensor circuit including an array of pixel units that includes N rows of pixel units; and a driving circuit including at least N rows of shifting units; where the driving circuit further includes: a first global clearing signal line connected with odd rows of shifting units, a signal of which being applied to trigger the odd rows of shifting units to simultaneously turn on odd rows of pixel units, so that the odd rows of pixel units simultaneously discharge residual charge; and a second global clearing signal line connected with even rows of shifting units, a signal of which being applied to trigger the even rows of shifting units to simultaneously turn on even rows of pixel units, so that the even rows of pixel units simultaneously discharge residual charge.

20 Claims, 10 Drawing Sheets

(58) Field of Classification Search
USPC .......................................................... 348/311
See application file for complete search history.

(56) References Cited

U.S. PATENT DOCUMENTS

2013/0235242 A1* 9/2013 Watanabe .......... H04N 5/23245
348/308
2014/0362269 A1* 12/2014 Omori ...................... H04N 9/07
348/308

FOREIGN PATENT DOCUMENTS

CN 108604593 A 9/2018
CN 208028993 U 10/2018

\* cited by examiner

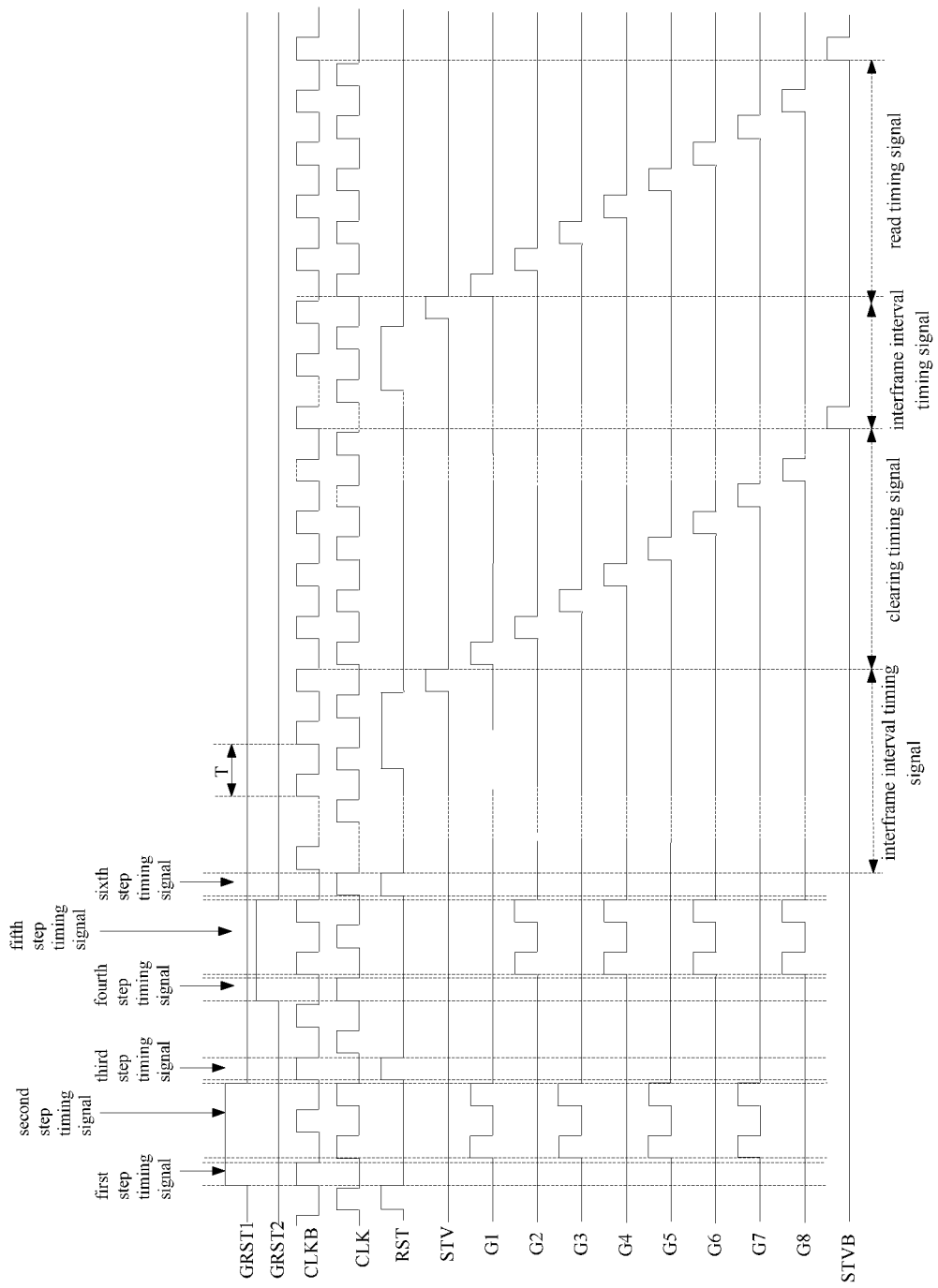

ary sensor, method for forming
AND OPERATING THE SAME

CROSS-REFERENCE TO RELATED APPLICATIONS

The present application is the national phase of International Application No. PCT/CN2018/095744, filed on Jul. 16, 2018, and entitled "ARRAY SENSOR, METHOD FOR FORMING AND OPERATING THE SAME", the entire disclosures of which are incorporated herein by reference.

TECHNICAL FIELD

The present invention relates to sensor field, and more particularly, to an array sensor, a method for forming and operating the same.

BACKGROUND

An array sensor is a large-area planar imaging device which includes an array of pixel units, driving lines, signal reading lines and so on. A light carrying image information is directly projected to pixel units on an imaging surface of the array sensor, and is absorbed by the pixel units for imaging. Since the light is not focused by any lens or fiber, an image with a same size as an object without any scaling can be acquired, thereby achieving better image quality and a lighter and thinner imaging device.

Based on the above advantages, array sensors have been widely used in various fields, such as fingerprint imaging, document scanning and so on.

However, performance of existing array sensors needs to be improved.

SUMMARY

An array sensor and a method for forming and operating the array sensor are provided in the present disclosure so as to improve performance of the array sensor.

In some embodiments, the array sensor may include: a sensor circuit, the sensor circuit including an array of pixel units, the array of pixel units comprising N rows of pixel units, and N being an integer greater than or equal to 1; and a driving circuit, the driving circuit including at least N rows of shifting units, an output signal of an i-th row of shifting unit being applied to control opening of an i-th row of pixel units, and i being an integer greater than or equal to 1 and less than or equal to N; wherein the driving circuit further includes a first global clearing signal line, the first global clearing signal line is connected with a plurality of odd rows of shifting units respectively, and a signal of the first global clearing signal line is applied to trigger the plurality of odd rows of shifting units to simultaneously turn on a plurality of odd rows of pixel units, so that the plurality of odd rows of pixel units simultaneously discharge residual charge; and wherein the driving circuit further includes a second global clearing signal line, the second global clearing signal line is connected with a plurality of even rows of shifting units respectively, and a signal of the second global clearing signal line is applied to trigger the plurality of even rows of shifting units to simultaneously turn on a plurality of even rows of pixel units, so that the plurality of even rows of pixel units simultaneously discharge residual charge.

In some embodiments, the driving circuit further includes a reset line, a first clock line, a second clock line, a continuous high level line, a continuous low level line, a first trigger line and a second trigger line; each row of shifting unit includes: a first transistor, a second transistor, a third transistor, a fourth transistor, a fifth transistor, a sixth transistor, a seventh transistor, an eighth transistor, a ninth transistor, a tenth transistor, a first capacitor and a second capacitor, each of transistors from the first transistor to the tenth transistor has a first electrode and a second electrode, the first electrode is a source and the second electrode is a drain, or the first electrode is a drain and the second electrode is a source, and the first capacitor and the second capacitor each have a first terminal and a second terminal opposite to each other; in the each row of shifting unit, the first terminal of the second capacitor is connected with the second electrode of the first transistor, the first electrode of the second transistor, the first electrode of the third transistor, the first electrode of the sixth transistor, a gate of the fourth transistor, a gate of the fifth transistor, and the second electrode of the tenth transistor, the first terminal of the first capacitor is connected with a gate of the third transistor, a gate of the seventh transistor and the first electrode of the fifth transistor, the second terminal of the first capacitor is connected with the first electrode of the fourth transistor, the reset line is connected with both a gate of the sixth transistor and a gate of the ninth transistor, and the continuous low level line is connected with the second electrode of the second transistor, the second electrode of the third transistor, the second electrode of the fifth transistor, the second electrode of the sixth transistor, the second electrode of the seventh transistor, the second electrode of the eighth transistor and the second electrode of the ninth transistor; in the i-th row of shifting unit, the second terminal of the second capacitor is connected with the second electrode of the fourth transistor, the first electrode of the seventh transistor, the first electrode of the eighth transistor and the first electrode of the ninth transistor at a connection point of an i-th output terminal, and the i-th output terminal is configured to output the output signal of the i-th row of shifting unit to the i-th row of pixel units; a gate of the first transistor in a first row of shifting unit is connected with the first trigger line; in the each row of shifting unit, the continuous high level line is connected with both the first electrode of the first transistor and the first electrode of the tenth transistor; a gate of the second transistor in a (k−1)-th row of shifting unit is connected with a k-th output terminal, a gate of the first transistor in a k-th row of shifting unit is connected with a (k−1)-th output terminal, k is an integer greater than or equal to 2 and less than or equal to N; and, in an N-th row of shifting unit, a gate of the second transistor is connected with the second trigger line, or the gate of the second transistor is connected with the continuous low level line, or the gate of the second transistor is connected with the reset line; and in each odd row of shifting unit, the first clock line is connected with the second terminal of the first capacitor and the first electrode of the fourth transistor, the second clock line is connected with a gate of the eighth transistor, and the first global clearing signal line is connected with a gate of the tenth transistor; in each even row of shifting unit, the second clock line is connected with the second terminal of the first capacitor and the first electrode of the fourth transistor, the first clock line is connected with a gate of the eighth transistor, and the second global clearing signal line is connected with a gate of the tenth transistor.

In some embodiments, each of the first transistor, the second transistor, the third transistor, the fourth transistor, the fifth transistor, the sixth transistor, the seventh transistor, the eighth transistor, the ninth transistor and the tenth transistor includes an N-type thin film transistor.

In some embodiments, in the N-th row of shifting unit, when the gate of the second transistor is connected with the second trigger line, a signal of the second trigger line is applied to turn off an output of the N-th row of shifting unit; or in the N-th row of shifting unit, when the gate of the second transistor is connected with the continuous low level line or the reset line, a part of signal of the reset line is applied to turn off the output of the N-th row of shifting unit.

A method for operating the array sensor is also provided according to embodiments of the present disclosure. The method may include inputting a global clearing timing signal to the driving circuit, where inputting the global clearing timing signal to the driving circuit may include: inputting a first sub-global clearing timing signal and a second sub-global clearing timing signal to the driving circuit in sequence; under control of the first sub-global clearing timing signal, triggering, by the signal of the first global clearing signal line, the plurality of odd rows of shifting units to simultaneously turn on the plurality of odd rows of pixel units, so that the plurality of odd rows of pixel units simultaneously discharge residual charge; and under control of the second sub-global clearing timing signal, triggering, by the signal of the second global clearing signal line, the plurality of even rows of shifting units to simultaneously turn on the plurality of even rows of pixel units, so that the plurality of even rows of pixel units simultaneously discharge residual charge.

In some embodiments, the driving circuit further comprises a reset line, a first clock line, a second clock line, a continuous high level line, a continuous low level line, a first trigger line and a second trigger line; each row of shifting unit comprises: a first transistor, a second transistor, a third transistor, a fourth transistor, a fifth transistor, a sixth transistor, a seventh transistor, an eighth transistor, a ninth transistor, a tenth transistor, a first capacitor and a second capacitor, each of transistors from the first transistor to the tenth transistor has a first electrode and a second electrode, the first electrode is a source and the second electrode is a drain, or the first electrode is a drain and the second electrode is a source, and the first capacitor and the second capacitor respectively have a first terminal and a second terminal opposite to each other; in the each row of shifting unit, the first terminal of the second capacitor is connected with the second electrode of the first transistor, the first electrode of the second transistor, the first electrode of the third transistor, the first electrode of the sixth transistor, a gate of the fourth transistor, a gate of the fifth transistor, and the second electrode of the tenth transistor, the first terminal of the first capacitor is connected with a gate of the third transistor, a gate of the seventh transistor and the first electrode of the fifth transistor, the second terminal of the first capacitor is connected with the first electrode of the fourth transistor, the reset line is connected with both a gate of the sixth transistor and a gate of the ninth transistor, and the continuous low level line is connected with the second electrode of the second transistor, the second electrode of the third transistor, the second electrode of the fifth transistor, the second electrode of the sixth transistor, the second electrode of the seventh transistor, the second electrode of the eighth transistor and the second electrode of the ninth transistor; in the i-th row of shifting unit, the second terminal of the second capacitor is connected with the second electrode of the fourth transistor, the first electrode of the seventh transistor, the first electrode of the eighth transistor and the first electrode of the ninth transistor at a connection point of an i-th output terminal, and the i-th output terminal is configured to output the output signal of the i-th row of shifting unit to the i-th row of pixel units; a gate of the first transistor in a first row of shifting unit is connected with the first trigger line; in the each row of shifting unit, the continuous high level line is connected with both the first electrode of the first transistor and the first electrode of the tenth transistor; a gate of the second transistor in a (k−1)-th row of shifting unit is connected with a k-th output terminal, a gate of the first transistor in a k-th row of shifting unit is connected with the (k−1)-th output terminal, k is an integer greater than or equal to 2 and less than or equal to N; and, in an N-th row of shifting unit, a gate of the second transistor is connected with the second trigger line, or the gate of the second transistor is connected with the continuous low level line, or the gate of the second transistor is connected with the reset line; and in the plurality of odd rows of shifting units, the first clock line is connected with the second terminal of the first capacitor and the first electrode of the fourth transistor, the second clock line is connected with a gate of the eighth transistor, and the first global clearing signal line is connected with a gate of the tenth transistor; in the plurality of even rows of shifting units, the second clock line is connected with the second terminal of the first capacitor and the first electrode of the fourth transistor, the first clock line is connected with a gate of the eighth transistor, and the second global clearing signal line is connected with a gate of the tenth transistor; and inputting, by the reset line, the first clock line, the second clock line, the first trigger line, the first global clearing signal line and the second global clearing signal line, the global clearing timing signal to the driving circuit; under the control of the first sub-global clearing timing signal, an output signal of the driving circuit simultaneously turns on the plurality of odd rows of pixel units; under the control of the second sub-global clearing timing signal, an output signal of the driving circuit simultaneously turns on the plurality of even rows of pixel units.

In some embodiments, in the global clearing timing signal, a signal of the first trigger line is a low level, and the first transistor in the first row of shifting unit is in an off state.

In some embodiments, inputting the first sub-global clearing timing signal may include: inputting a first step timing signal to the driving circuit; inputting a second step timing signal to the driving circuit after inputting the first step timing signal to the driving circuit; inputting a third step timing signal to the driving circuit after inputting the second step timing signal to the driving circuit; and in the first step timing signal, a signal of the first global clearing signal line is a high level, a signal of the second global clearing signal line is a low level, a signal of the first clock line is a low level, a signal of the second clock line is a high level, a signal of the reset line is a low level, and each odd row of shifting unit outputs a low level signal under control of the first step timing signal; in the second step timing signal, a signal of the first global clearing signal line is a low level, a signal of the second global clearing signal line is a low level, a signal of the first clock line is a high level, a signal of the second clock line is a low level, a signal of the reset line is a low level, and each odd row of shifting unit outputs a high level signal under control of the second step timing signal; in the third step timing signal, a signal of the first global clearing signal line is a low level, a signal of the second global clearing signal line is a low level, a signal of the first clock line is a low level or a high level, a signal of the reset line is a high level, and each odd row of shifting unit outputs a low level signal under control of the third step timing signal.

In some embodiments, in the global clearing timing signal, a signal of the first clock line is a high level and a signal of the second clock line is a low level, or the signal of the second clock line is a high level and the signal of the first clock line is a low level; and in the first sub-global clearing timing signal, the signal of the first clock line has a high level period longer than a low level period, and the second step timing signal has a duration longer than the first step timing signal and the third step timing signal.

In some embodiments, inputting the first sub-global clearing timing signal may include: inputting a first step timing signal to the driving circuit; inputting a second step timing signal to the driving circuit after inputting the first step timing signal to the driving circuit; inputting a third step timing signal to the driving circuit after inputting the second step timing signal to the driving circuit; and in the first step timing signal, a signal of the first global clearing signal line is a high level, a signal of the second global clearing signal line is a low level, a signal of the first clock line is a low level, a signal of the second clock line is a high level, a signal of the reset line is a low level, and each odd row of shifting unit outputs a low level signal under control of the first step timing signal; in the second step timing signal, a signal of the first global clearing signal line is a high level, a signal of the second global clearing signal line is a low level, a signal of the first clock line comprises a plurality of high levels, a signal of the second clock line comprises a plurality of low levels, a signal of the reset line is a low level, and each odd row of shifting unit outputs a plurality of high level signals under control of the second step timing signal; and in the third step timing signal, a signal of the first global clearing signal line is a low level, a signal of the second global clearing signal line is a low level, a signal of the first clock line is a low level or a high level, a signal of the reset line is a high level, and each odd row of shifting unit outputs a low level signal under control of the third step timing signal.

In some embodiments, in the global clearing timing signal, a signal of the first clock line is a high level and a signal of the second clock line is a low level, or the signal of the second clock line is a high level and the signal of the first clock line is a low level; and, in the global clearing timing signal, the signal of the first clock line and the signal of the second clock line both have a characteristic period, and a high level period of the signal of the first clock line is equal to a high level period of the signal of the second clock line.

In some embodiments, in the global clearing timing signal, a high level period of the signal of the first clock line is one half of the characteristic period, a high level period of the signal of the second clock line is one half of the characteristic period; in the global clearing timing signal, there is no time interval between a high level signal of the first clock line and a high level signal of the second clock line that is adjacent to the high level signal of the first clock line; and in the third step timing signal, the signal of the first clock line is a low level, and a signal of the second clock line is a high level; and the first step timing signal, the second step timing signal and the third step timing signal are continuous, and under the control of the second step timing signal, a high level period of the signal output by each odd row of shifting unit is one half of the characteristic period.

In some embodiments, in the global clearing timing signal, a high level period of the signal of the first clock line is shorter than one half of the characteristic period, a high level period of the signal of the second clock line is shorter than one half of the characteristic period; and in the global clearing timing signal, there is a time interval between a high level signal of the first clock line and a high level signal of the second clock line that is adjacent to the high level signal of the first clock line; and the first step timing signal, the second step timing signal and the third step timing signal are discontinuous, under the control of the second step timing signal, a high level period of the signal output by each odd row of shifting unit is shorter than one half of the characteristic period.

In some embodiments, inputting the second sub-global clearing timing signal may include: inputting a fourth step timing signal to the driving circuit; inputting a fifth step timing signal to the driving circuit after inputting the fourth step timing signal to the driving circuit; inputting a sixth step timing signal to the driving circuit after inputting the fifth step timing signal to the driving circuit; and in the fourth step timing signal, a signal of the first global clearing signal line is a low level, a signal of the second global clearing signal line is a high level, a signal of the first clock line is a high level, a signal of the second clock line is a low level, a signal of the reset line is a low level, and each even row of shifting unit outputs a low level signal under control of the fourth step timing signal; in the fifth step timing signal, a signal of the first global clearing signal line is a low level, a signal of the second global clearing signal line is a low level, a signal of the second clock line is a high level, a signal of the first clock line is a low level, a signal of the reset line is a low level, and each even row of shifting unit outputs a high level signal under control of the fifth step timing signal; in the sixth step timing signal, a signal of the first global clearing signal line is a low level, a signal of the second global clearing signal line is a low level, a signal of the second clock line is a low level or a high level, a signal of the reset line is a high level, and each even row of shifting unit outputs a low level signal under control of the sixth step timing signal.

In some embodiments, in the global clearing timing signal, a signal of the first clock line is a high level and a signal of the second clock line is a low level, or a signal of the second clock line is a high level and a signal of the first clock line is a low level; and in the second sub-global clearing timing signal, the signal of the second clock line has a high level period longer than a low level period, and the fifth step timing signal has a duration longer than the fourth step timing signal and the sixth step timing signal.

In some embodiments, inputting the second sub-global clearing timing signal may include: inputting a fourth step timing signal to the driving circuit; inputting a fifth step timing signal to the driving circuit after inputting the fourth step timing signal to the driving circuit; inputting a sixth step timing signal to the driving circuit after inputting the fifth step timing signal to the driving circuit; and in the fourth step timing signal, a signal of the first global clearing signal line is a low level, a signal of the second global clearing signal line is a high level, a signal of the first clock line is a high level, a signal of the second clock line is a low level, a signal of the reset line is a low level, and each even row of shifting unit outputs a low level signal under control of the fourth step timing signal; in the fifth step timing signal, a signal of the first global clearing signal line is a low level, a signal of the second global clearing signal line is a high level, a signal of the second clock line comprises a plurality of high levels, a signal of the first clock line comprises a plurality of low levels, a signal of the reset line is a low level, and each even row of shifting unit outputs a plurality of high level signals under control of the fifth step timing signal; and in the sixth step timing signal, a signal of the first global clearing signal line is a low level, a signal of the second global clearing signal line is a low level, a signal of the second clock line is a low level or a high level, a signal of the reset line is a high level, and each even row of shifting unit outputs a low level signal under control of the sixth step timing signal.

In some embodiments, in the global clearing timing signal, a signal of the first clock line is a high level and a signal of the second clock line is a low level, or a signal of the second clock line is a high level and a signal of the first clock line is a low level; and in the global clearing timing signal, the signal of the first clock line and the signal of the second clock line both have a characteristic period, and a high level period of the signal of the first clock line is equal to a high level period of the signal of the second clock line.

In some embodiments, in the global clearing timing signal, a high level period of the signal of the first clock line is one half of the characteristic period; a high level period of the signal of the second clock line is one half of the characteristic period; in the global clearing timing signal, there is no time interval between a high level signal of the first clock line and a high level signal of the second clock line that is adjacent to the high level signal of the first clock line; and in the sixth step timing signal, the signal of the second clock line is a low level, and a signal of the first clock line is a high level; and the fourth step timing signal, the fifth step timing signal and the sixth step timing signal are continuous, under control of the fifth step timing signal, a high level period of the signal output by each even row of shifting unit is one half of the characteristic period.

In some embodiments, in the global clearing timing signal, a high level period of the signal of the first clock line is shorter than one half of the characteristic period; a high level period of the signal of the second clock line is shorter than one half of the characteristic period; in the global clearing timing signal, there is a time interval between a high level signal of the first clock line and a high level signal of the second clock line that is adjacent to the high level signal of the first clock line; and the fourth step timing signal, the fifth step timing signal and the sixth step timing signal are discontinuous, under control of the fifth step timing signal, a high level period of the signal output by each even row of shifting unit is shorter than one half of the characteristic period.

A method for forming the aforementioned array sensor is also provided according to embodiments of the present disclosure. The method may include: forming a sensor circuit, wherein the sensor circuit comprises an array of pixel units, the array of pixel units comprises N rows of pixel units, and N is an integer greater than or equal to 1; and forming a driving circuit, wherein forming the driving circuit comprises forming at least N rows of shifting units, an output signal of an i-th row of shifting unit is applied to control opening of an i-th row of pixel unit, and i is an integer greater than or equal to 1 and less than or equal to N; where forming the driving circuit further comprises forming a first global clearing signal line, the first global clearing signal line is connected with a plurality of odd rows of shifting units respectively, and a signal in the first global clearing signal line is applied to trigger the plurality of odd rows of shifting units to simultaneously turn on a plurality of odd rows of pixel units, so that the plurality of odd rows of pixel units simultaneously discharge residual charge; and wherein forming the driving circuit further comprises forming a second global clearing signal line, the second global clearing signal line is connected with a plurality of even rows of shifting units respectively, and a signal in the second global clearing signal line is applied to trigger the plurality of even rows of shifting units to simultaneously turn on a plurality of even rows of pixel units, so that the plurality of even rows of pixel units simultaneously discharge residual charge.

Compared with the existing technology, the present disclosure has the following advantages.

In the array sensor according to embodiments of the present disclosure, the plurality of odd rows of shifting units are configured to turn on the plurality of odd rows of pixel units, so that the plurality of odd rows of pixel units can discharge the residual charge, and the plurality of even rows of shifting units are configured to turn on the plurality of even rows of pixel units, so that the plurality of even rows of pixel units can discharge the residual charge. In this way, the array sensor will not be interfered by the residual signal when capturing image information. The driving circuit further includes a first global clearing signal line and a second global clearing signal line; where the first global clearing signal line is connected with the plurality of odd rows of shifting units respectively, and a signal of the first global clearing signal line is applied to trigger the plurality of odd rows of shifting units to simultaneously turn on the plurality of odd rows of pixel units; and the second global clearing signal line is connected with the plurality of even rows of shifting units respectively, and a signal of the second global clearing signal line is applied to trigger the plurality of even rows of shifting units to simultaneously turn on the plurality of even rows of pixel units. Since the plurality of odd rows of shifting units simultaneously turn on the plurality of odd rows of pixel units, and the plurality of even rows of shifting units simultaneously turn on the plurality of even rows of pixel units, the plurality of odd rows of pixel units simultaneously discharge the residual signal, and the plurality of even rows of pixel units simultaneously discharge the residual signal. Therefore, even if there are a plenty of residual signals, the residual signals in the pixel units can be cleared in a short time, and a total time for the array sensor capturing image information can be reduced, thereby improving performance of the array sensor.

In the method for operating the array sensor according to embodiments of the present disclosure, under the control of the first sub-global clearing timing signal, a signal of the first global clearing signal line triggers the plurality of odd rows of shifting units to simultaneously turn on the plurality of odd rows of pixel units, so that the plurality of odd rows of pixel units simultaneously discharge residual charge; and under the control of the second sub-global clearing timing signal, a signal of the second global clearing signal line triggers the plurality of even rows of shifting units to simultaneously turns on the plurality of even rows of pixel units, so that the plurality of even rows of pixel units simultaneously discharge residual charge. Therefore, even if there are a plenty of residual signals, the residual signals in the pixel units can be cleared in a short time, and a total time for the array sensor capturing image information can be reduced, thereby improving performance of the array sensor.

BRIEF DESCRIPTION OF THE DRAWINGS

FIG. 10 schematically illustrates a timing diagram of a reset line, a first clock line, a second clock line, a continuous high level line, a continuous low level line, a first trigger line, a second trigger line, a first global clearing signal lines and a second global clearing signal lines according to another embodiment of the present disclosure.

DETAILED DESCRIPTION

Figure 1:
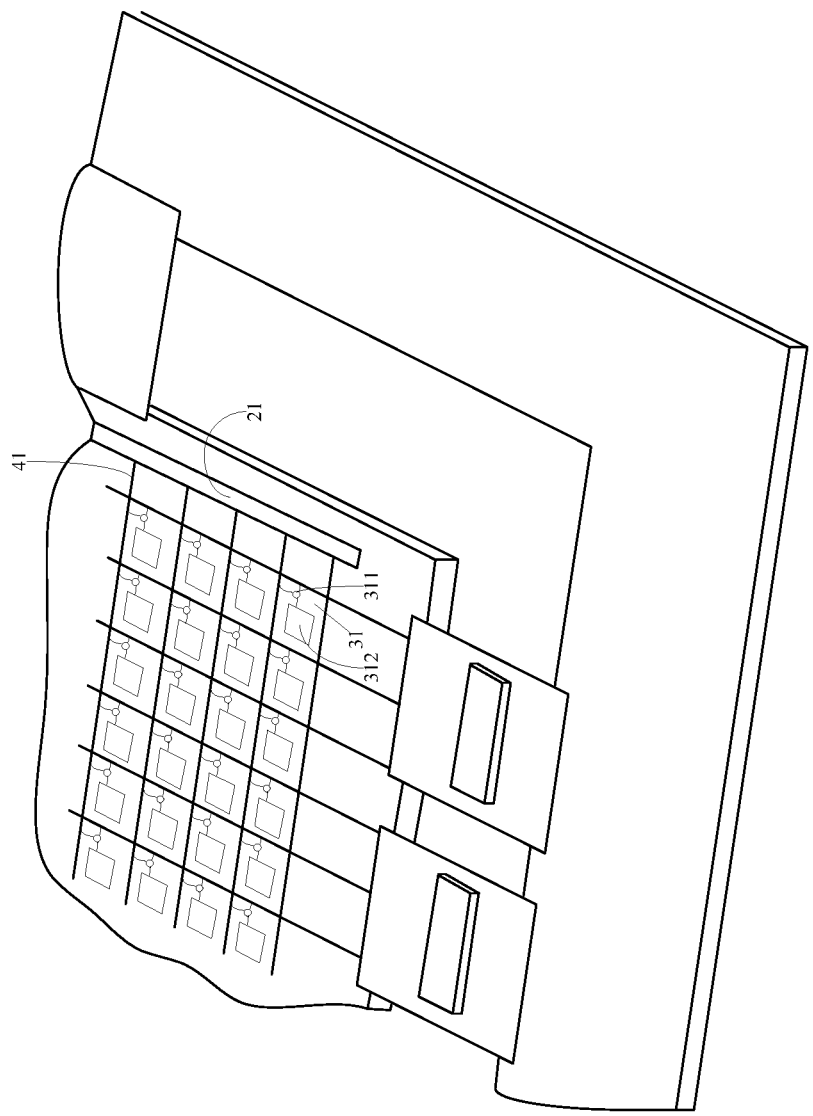
FIG. 1 schematically illustrates a structural diagram of an array sensor according to an embodiment of the present disclosure.

As described in the background art, performance of array sensors in the existing technology needs to be improved.

An array sensor includes a driving circuit and a sensor circuit. The sensor circuit includes an array of pixel units, and the array of pixel units include a plurality of rows of pixel units. The driving circuit includes a plurality of rows of shifting units, and an output signal of an i-th row of shifting unit is applied to control opening of an i-th row of pixel units.

Usually, there are residual signals in the pixel units due to two aspects of reasons: on one hand, ambient light continues to enter the pixel units before the array sensor starts to operate, which will generate a signal; on the other hand, photosensitive elements in the pixel units continuously have electronic leakage, which will also generate a signal. In order to prevent the array sensor from being interfered by the residual signals when the array sensor captures image information, it is necessary to clear the residual signals of each row of pixel units by the driving circuit before the array sensor capturing image. Specifically, the driving circuit generates an output signal under control of a clearing timing signal, and an output signal of each row of shifting unit controls opening of a corresponding row of pixel units, so that the corresponding row of pixel units can discharge residual signals.

However, due to the output signal of the driving circuit turning on the pixel units row by row, when there are too many residual signals, clearing the residual signals in the pixel units row by row only once cannot clear up all the residual signals in the pixel units. Instead, the residual signals in the pixel units need to be cleared row by row for multiple times, which results in a long time to clear up the residual signals in the pixel units and a long time for the array sensor to capture image information. Therefore, the performance of the array sensor degrades.

In view of the above problem, an array sensor is provided in the present disclosure. The array sensor may include a driving circuit, and the driving circuit may include a first global clearing signal line and a second global clearing signal line. The first global clearing signal line is connected with a plurality of odd rows of shifting units respectively, and a signal of the first global clearing signal line is applied to trigger the plurality of odd rows of shifting units to simultaneously turn on a plurality of odd rows of pixel units, so that the plurality of odd rows of pixel units simultaneously discharge residual charge. The second global clearing signal line is connected with a plurality of even rows of shifting units respectively, and a signal of the second global clearing signal line is applied to trigger the plurality of even rows of shifting units to simultaneously turn on a plurality of even rows of pixel units, so that the plurality of even rows of pixel units simultaneously discharge residual charge. Performance of the array sensor can be improved.

In order that the foregoing objects, features, and advantages of the present disclosure will become more apparent, following specific embodiments will be described in detail in conjunction with the accompanying drawings.

Figure 2:
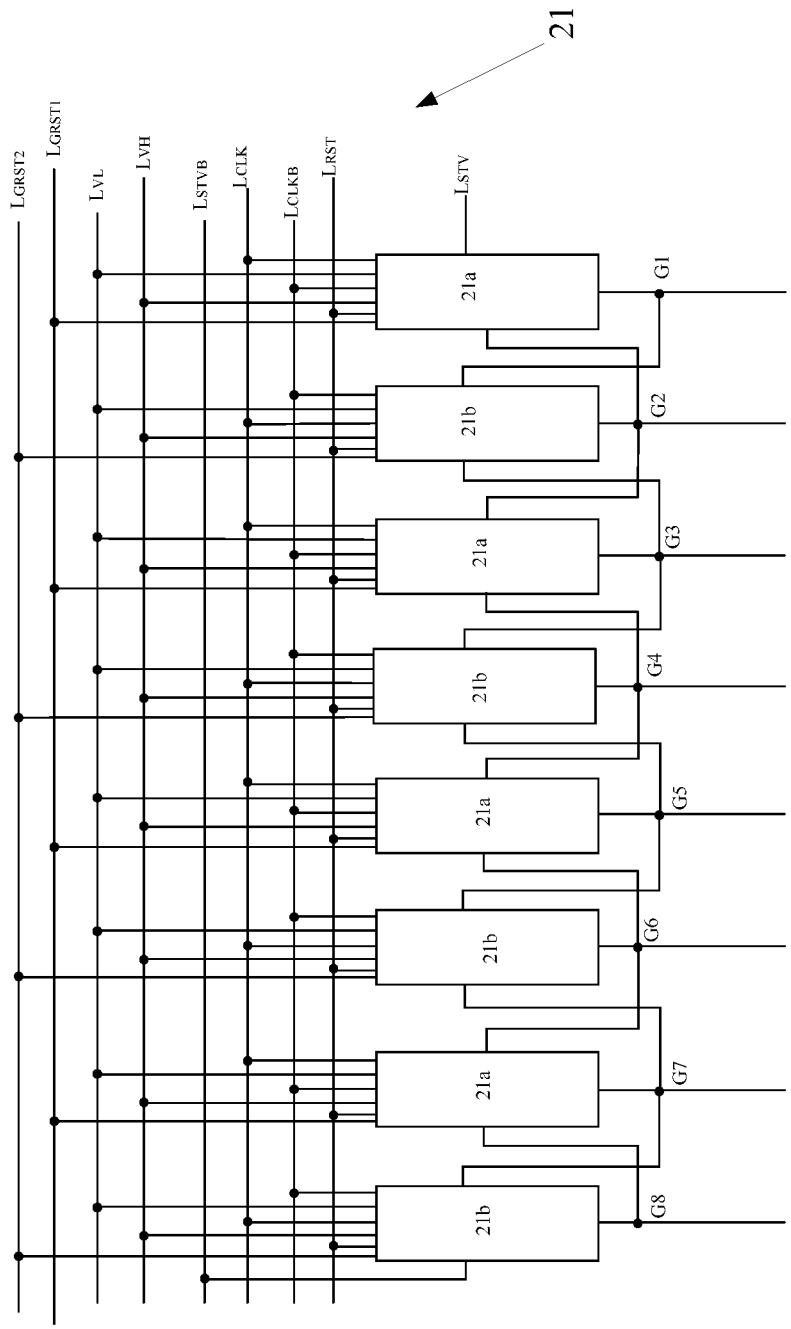
FIG. 2 schematically illustrates a diagram of a driving circuit of the array sensor shown in FIG. 1.

An array sensor is provided according to embodiments. Referring to FIG. 1 and FIG. 2, the array sensor may include a sensor circuit and a driving circuit 21.

The sensor circuit may include an array of pixel units, and the array of pixel units may include N rows of pixel units 31, where N is an integer greater than or equal to 1.

The driving circuit 21 may include at least N rows of shifting units (referring to FIG. 2), and an output signal of an i-th row of shifting unit is applied to control opening of an i-th row of pixel units 31, where i is an integer greater than or equal to 1 and less than or equal to N.

The driving circuit 21 may further include a first global clearing signal line $L_{GRST1}$ (referring to FIG. 2) and a second global clearing signal line $L_{GRST2}$. The first global clearing signal line $L_{GRST1}$ is connected with a plurality of odd rows of shifting units 21a respectively, and a signal of the first global clearing signal line $L_{GRST1}$ is applied to trigger the plurality of odd rows of shifting units 21a to simultaneously turn on a plurality of odd rows of pixel units 31, so that the plurality of odd rows of pixel units 31 simultaneously discharge residual charge. The second global clearing signal line $L_{GRST2}$ is connected with a plurality of even rows of shifting units 21b respectively, and a signal of the second global clearing signal line $L_{GRST2}$ is applied to trigger the plurality of even rows of shifting units 21b to simultaneously turn on a plurality of even rows of pixel units 31, so that the plurality of even rows of pixel units 31 simultaneously discharge residual charge.

In some embodiments, the sensor circuit may further include at least one driving line 41 that is connected with one or more pixel units 31.

In some embodiments, each pixel unit 31 may include a photosensitive device 312 and a switching device 311, where the switching device 311 is connected with a driving line 41. The photosensitive device 312 may include a photodiode. The switching device 311 may include a thin film transistor.

In some embodiments, the driving circuit 21 is configured to turn on the pixel units 31.

Referring to FIG. 2, a driving circuit 21 is provided according to embodiments of the present disclosure. The driving circuit 21 may include at least N rows of shifting units, and the at least N rows of shifting units include a plurality of odd rows of shifting units 21a and a plurality of even rows of shifting units 21b. There may be one shifting unit in each row.

In the present embodiment, N with a value of eight is taken as an example. In other embodiments, N may be other integers greater than or equal to 1, and N may be an even number or an odd number.

In the present embodiment, the driving circuit 21 includes N rows of shifting units. In other embodiments, a total row number of the shifting units may be greater than a total row number of the pixel units 31.

When a total row number of the shifting units is greater than a total row number of the pixel units 31, N rows of shifting units in a middle segment of the driving circuit 21 may be respectively connected with the N rows of pixel units, and the N rows of shifting units in the middle segment are sequentially numbered from a first row of shifting unit to an N-th row of shifting unit. The remaining shifting units are not connected with the pixel units 31. In this approach, the shifting units in the middle segment of the driving circuit 21 have better performance and fewer defects, making the array sensor more reliable and stable.

In some embodiment, the driving circuit 21 may include a first row of shifting unit 21a, a second row of shifting unit 21b, a third row of shifting unit 21a, a fourth row of shifting unit 21b, a fifth row of shifting unit 21a, a sixth row of shifting unit 21b, a seventh row of shifting unit 21a and an eighth row of shifting unit 21b.

The i-th row of shifting unit may have an i-th output terminal $G_i$, and the i-th output terminal $G_i$ may be used to output an output signal of the i-th row of shifting unit. The first row of shifting unit 21a may have a first output terminal $G_1$, the second row of shifting unit 21b may have a second output terminal $G_2$, the third row of shifting unit 21a may have a third output terminal $G_3$, the fourth row of shifting unit 21b may have a fourth output terminal $G_4$, the fifth row of shifting unit 21a may have a fifth output terminal $G_5$, the sixth row of shifting unit 21b may have a sixth output terminal $G_6$, and the seventh row of shifting unit 21a may have a seventh output terminal $G_7$, and the eighth row of shifting unit 21b may have an eighth output terminal $G_8$.

The i-th output terminal $G_i$ of the i-th row of shifting unit may be electrically connected with an i-th row of driving line 41, and the i-th output terminal $G_i$ may be used for outputting an output signal of the i-th row of shifting unit to the i-th row of driving line 41.

In some embodiments, the driving circuit 21 may further include a reset line $L_{RST}$, a first clock line $L_{CLK}$, a second clock line $L_{CLKB}$, a continuous high level line $L_{VH}$, a continuous low level line $L_{VL}$, a first trigger line $L_{STV}$ and a second trigger line $L_{STVB}$.

A first power terminal of each row of shifting unit may be connected with the continuous high level line $L_{VH}$ and configured to receive a high level signal VH. A second power terminal of each row of shifting unit may be connected with the continuous low level line $L_{VL}$ and configured to receive a low level signal VL. A first clock terminal of each row of shifting unit may be connected with the first clock line $L_{CLK}$ and configured to receive a first clock signal CLK. A second clock terminal of each row of shifting unit may be connected with the second clock line $L_{CLKB}$ and configured to receive a second clock signal CLKB. Global clearing terminals of the plurality of odd rows of shifting units 21a may be connected with the first global clearing signal line $L_{GRST1}$ and configured to receive a first global clearing signal GRST1. Global clearing terminals of the plurality of even rows of shifting units 21b may be connected with the second global clearing signal line $L_{GRST2}$ and configured to receive a second global clearing signal GRST2. A reset terminal of each row of shifting unit may be connected with the reset line $L_{RST}$ and configured to receive a reset signal RST. A first trigger terminal of the first row of shifting unit 21a may be connected with the first trigger line $L_{STV}$ and configured to receive a first trigger signal STY. A second trigger terminal of a (k−1)-th row of shifting unit may be connected with a k-th output terminal of a k-th row of shifting unit, and a first trigger terminal of a k-th row of shifting unit may be connected with a (k−1)-th output terminal of a (k−1)-th row of shifting unit, where k is an integer greater than or equal to 2 and less than or equal to N.

In some embodiment, a second trigger terminal of the N-th row of shifting unit may be connected with the second trigger line $L_{STVB}$ and configured to receive a second trigger signal STVB, and a signal in the second trigger line $L_{STVB}$ may be configured to turn off an output of the N-th row of shifting unit. In the present embodiment, N is equal to eight. Therefore, a second trigger terminal of the eighth row of shifting unit 21a is connected with the second trigger line $L_{STVB}$ and configured to receive the second trigger signal STVB.

In another embodiment, the second trigger terminal of the N-th row of shifting unit may be connected with the continuous low level line; or the second trigger terminal of the N-th row of shifting unit may be connected with the reset line, and a part of signal of the reset line is used to turn off the output of the N-th row of shifting unit.

Figure 3:
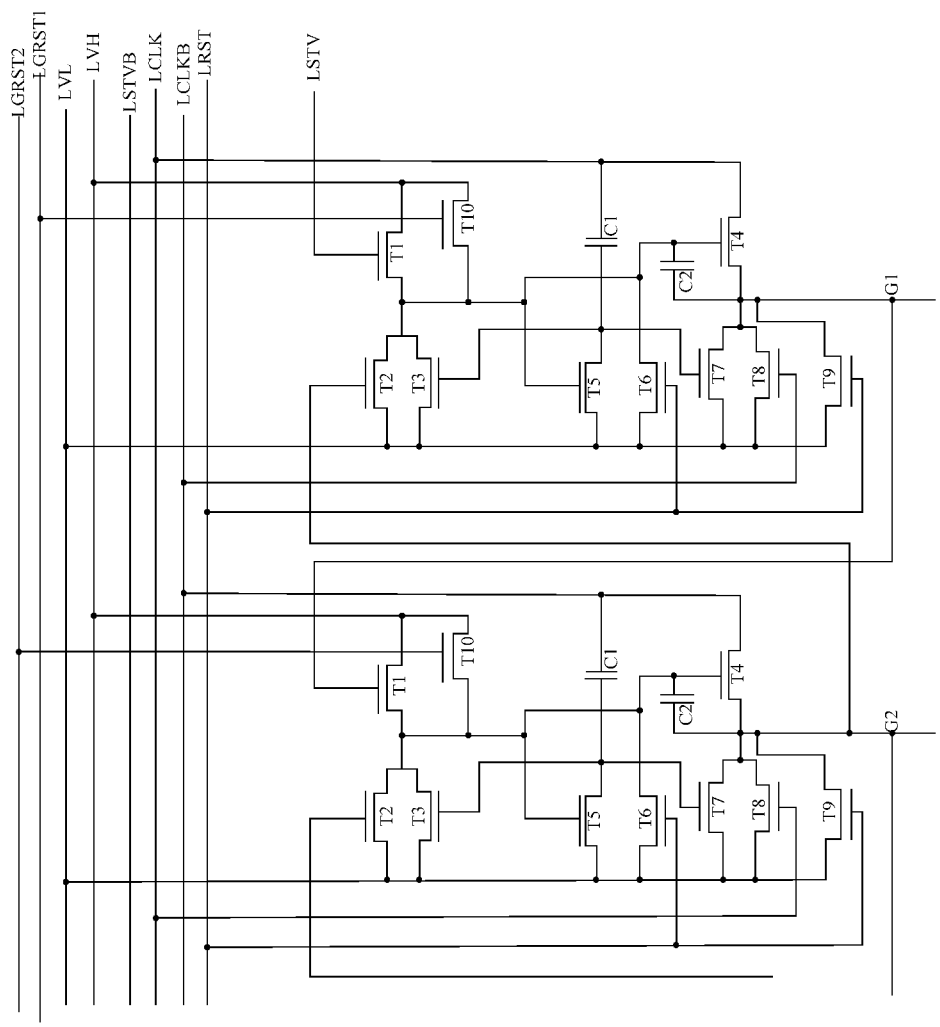
FIG. 3 schematically illustrates a circuit diagram of a shifting unit of the driving circuit shown in FIG. 2.

Referring to FIG. 3, FIG. 3 schematically illustrates a shifting unit according to embodiments of the present disclosure. Each row of shifting unit may include: a first transistor T1, a second transistor T2, a third transistor T3, a fourth transistor T4, a fifth transistor T5, a sixth transistor T6, a seventh transistor T7, an eighth transistor T8, a ninth transistor T9, a tenth transistor T10, a first capacitor C1 and a second capacitor C2. Each transistor from the first transistor T1 to the tenth transistor T10 has a first electrode and a second electrode. The first electrode is a source and the second electrode is a drain, or the first electrode is a drain and the second electrode is a source. The first capacitor C1 and the second capacitor C2 each have a first terminal and a second terminal opposite to each other.

In some embodiment, each of the first transistor T1, the second transistor T2, the third transistor T3, the fourth transistor T4, the fifth transistor T5, the sixth transistor T6, the seventh transistor T7, the eighth transistor T8, the ninth transistor T9 and the tenth transistor T10 includes an N-type thin film transistor. In other embodiments, the first transistor T1, the second transistor T2, the third transistor T3, the fourth transistor T4, the fifth transistor T5, the sixth transistor T6, the seventh transistor T7, the eighth transistor T8, the ninth transistor T9 and the tenth transistor T10 may also be other different types of transistors.

In each row of shifting unit, the first terminal of the second capacitor C2 may be connected with the second electrode of the first transistor T1, the first electrode of the second transistor T2, the first electrode of the third transistor T3, the first electrode of the sixth transistor T6, a gate of the fourth transistor T4, a gate of the fifth transistor T5, and the second electrode of the tenth transistor T10, the first terminal of the first capacitor C1 may be connected with a gate of the third transistor T3, a gate of the seventh transistor T7 and the first electrode of the fifth transistor T5, the second terminal of the first capacitor C1 may be connected with the first electrode of the fourth transistor T4, the reset line $L_{RST}$ may be connected with both a gate of the sixth transistor T6 and a gate of the ninth transistor T9, and the continuous low level line $L_{VL}$ may be connected with the second electrode of the second transistor T2, the second electrode of the third transistor T3, the second electrode of the fifth transistor T5, the second electrode of the sixth transistor T6, the second electrode of the seventh transistor T7, the second electrode of the eighth transistor T8 and the second electrode of the ninth transistor T9. In the i-th row of shifting unit, the second terminal of the second capacitor C2 is connected with the second electrode of the fourth transistor T4, the first electrode of the seventh transistor T7, the first electrode of the eighth transistor T8 and the first electrode of the ninth transistor T9 at a connection point of an i-th output terminal $G_i$, and the i-th output terminal $G_i$ is configured to output the output signal of the i-th row of shifting unit to the i-th row of pixel units. A gate of the first transistor T1 in a first row of shifting unit 21a is connected with the first trigger line $L_{STV}$. In the each row of shifting unit, the continuous high level line $L_{VH}$ is connected with both the first electrode of the first transistor T1 and the first electrode of the tenth transistor T10. A gate of the second transistor T2 in a (k−1)-th row of shifting unit is connected with a k-th output terminal $G_k$, and a gate of the first transistor T1 in a k-th row of shifting unit is connected with an (k−1)-th output terminal $G_{k-1}$, where k is an integer greater than or equal to 2 and less than or equal to N. In an N-th row of shifting unit, a gate of the second transistor T2 is connected with the second trigger line $L_{STVB}$, or the gate of the second transistor T2 is connected with the continuous low level line $L_{VL}$, or the gate of the second transistor T2 is connected with the reset line $L_{RST}$.

In each odd row of shifting unit 21a, the first clock line $L_{CLK}$ is connected with the second terminal of the first capacitor C1 and the first electrode of the fourth transistor T4, the second clock line $L_{CLKB}$ is connected with a gate of the eighth transistor T8, and the first global clearing signal line $L_{GRST1}$ is connected with a gate of the tenth transistor T10. In each even row of shifting unit 21b, the second clock line $L_{CLKB}$ is connected with the second terminal of the first capacitor C1 and the first electrode of the fourth transistor T4, the first clock line $L_{CLK}$ is connected with a gate of the eighth transistor T8, and the second global clearing signal line $L_{GRST2}$ is connected with a gate of the tenth transistor T10.

In the N-th row of shifting unit, when the gate of the second transistor T2 is connected with the second trigger line $L_{STVB}$, a signal of the second trigger line $L_{STVB}$ is applied to turn off an output of the N-th row of shifting unit. In the N-th row of shifting unit, when the gate of the second transistor T2 is connected with the continuous low level line $L_{VL}$ or the reset line $L_{RST}$, a part of signal in the reset line $L_{RST}$ is used to turn off the output of the N-th row of shifting unit.

In the aforementioned circuit of the shifting unit, a connection point of the first electrode of the first transistor T1 and the first electrode of the tenth transistor T10 is a first power terminal, a connection point of the second electrode of the second transistor T2, the second electrode of the third transistor T3, the second electrode of the fifth transistor T5, the second electrode of the sixth transistor T6, the second electrode of the seventh transistor T7, the second electrode of the eighth transistor T8 and the second electrode of the ninth transistor T9 is a second power terminal, a connection point of the gate of the sixth transistor T6 and the gate of the ninth transistor T9 is a reset terminal, the gate of the first transistor T1 in the first row of shifting unit 21a is a first trigger terminal, and the gate of the second transistor T2 in the N-th row of shifting unit is a second trigger terminal.

In the aforementioned circuit of shifting unit, the gate of the tenth transistor T10 in an odd row of shifting unit 21a is a global clearing terminal of the odd row of shifting unit 21a, and the gate of the tenth transistor T10 in an even row of shifting unit 21b is a global clearing terminal of the even row of shifting unit 21b. In the aforementioned circuit of shifting unit, a connection point of the second terminal of the first capacitor C1 and the first electrode of the fourth transistor T4 in an odd row of shifting unit 21a is a first clock terminal of the odd row of shifting unit 21a, the gate of the eighth transistor T8 in an odd row of shifting unit 21a is a second clock terminal of the odd row of shifting unit 21a, a connection point of the second terminal of the first capacitor C1 and the first electrode of the fourth transistor T4 in an even row of shifting unit 21b is a second clock terminal of the even row of shifting unit 21b, and the gate of the eighth transistor T8 in an even row of shifting unit 21b is a first clock terminal of the even row of shifting unit 21b.

Figure 4:
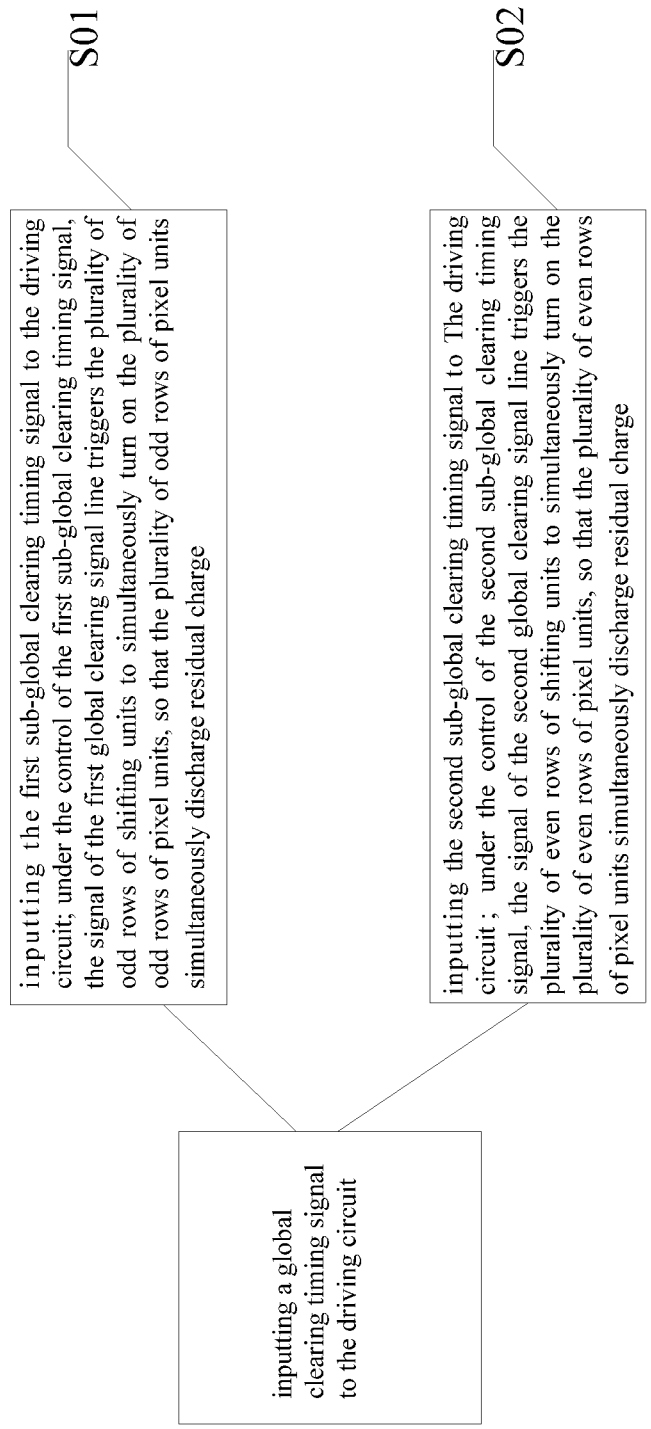
FIG. 4 schematically illustrates a flow chart of a method for operating the array sensor according to an embodiment of the present disclosure.

A method for operating the aforementioned array sensor is also provided in the present disclosure. Referring to FIG. 4, in some embodiments, the method may include: inputting a global clearing timing signal to the driving circuit, where inputting the global clearing timing signal to the driving circuit may include inputting a first sub-global clearing timing signal and a second sub-global clearing timing signal to the driving circuit in sequence.

Specifically, in S01, the first sub-global clearing timing signal is input to the driving circuit, and under the control of the first sub-global clearing timing signal, the signal of the first global clearing signal line triggers the plurality of odd rows of shifting units to simultaneously turn on the plurality of odd rows of pixel units, so that the plurality of odd rows of pixel units simultaneously discharge residual charge. In S02, the second sub-global clearing timing signal is input to the driving circuit, and under the control of the second sub-global clearing timing signal, the signal of the second global clearing signal line triggers the plurality of even rows of shifting units to simultaneously turn on the plurality of even rows of pixel units, so that the plurality of even rows of pixel units simultaneously discharge residual charge.

Referring to FIG. 5, FIG. 6, FIG. 7, FIG. 8, FIG. 9 and FIG. 10, the reset line $L_{RST}$, the first clock line Lax, the second clock line $L_{CLKB}$, the first trigger line $L_{STV}$, the first global clearing signal line $L_{GRST1}$ and the second global clearing signal line $L_{GRST2}$ are applied to input a global clearing timing signal to the driving circuit 21. Under the control of the first sub-global clearing timing signal, an output signal of the driving circuit 21 simultaneously turns on the plurality of odd rows of pixel units 31. Under the control of the second sub-global clearing timing signal, an output signal of the driving circuit 21 simultaneously turns on the plurality of even rows of pixel units 31.

In some embodiment, in the N-th row of shifting unit, when the gate of the second transistor T2 is connected with the second trigger line $L_{STVB}$, correspondingly the reset line $L_{RST}$, the first clock line $L_{CLK}$, the second clock line $L_{CLKB}$, the first trigger line $L_{STV}$, the second trigger line $L_{STVB}$, the first global clearing signal line $L_{GRST1}$ and the second global clearing signal line $L_{GRST2}$ are applied to input a global clearing timing signal to the driving circuit 21.

It should be noted that, under the control of the first sub-global clearing timing signal, the output signal of the driving circuit 21 simultaneously turns on the plurality of odd rows of pixel units 31, but does not turn on the plurality of even rows of pixel units 31. Under the control of the second sub-global clearing timing signal, the output signal of the driving circuit 21 simultaneously turns on the plurality of even rows of pixel units 31, but does not turn on the plurality of odd rows of pixel units 31.

In the global clearing timing signal, a signal of the first trigger line $L_{STV}$ is a low level, and the first transistor T1 in the first row of shifting unit is in an off state.

In some embodiment, in the N-th row of shifting unit, when the gate of the second transistor T2 is connected with the second trigger line $L_{STVB}$, in the global clearing timing signal, a signal of the second trigger line $L_{STVB}$ is a low level, and the second transistor T2 in the 2N-th row of shifting unit is in an off state.

Referring to FIG. 5, FIG. 6, FIG. 7, FIG. 8, FIG. 9 and FIG. 10, in the global clearing timing signal, when a signal of the first clock line $L_{CLK}$ is a high level, a signal of the second clock line $L_{CLKB}$ is a low level; when the signal of the second clock line $L_{CLKB}$ is a high level, the signal of the first clock line $L_{CLK}$ is a low level.

Referring to FIG. 5, FIG. 6, FIG. 7, FIG. 8, FIG. 9 and FIG. 10, in some embodiments, inputting the first sub-global clearing timing signal may include: inputting a first step timing signal to the driving circuit; inputting a second step timing signal to the driving circuit after inputting the first step timing signal to the driving circuit; inputting a third step timing signal to the driving circuit after inputting the second step timing signal to the driving circuit; and inputting the second sub-global clearing timing signal may include: inputting a fourth step timing signal to the driving circuit; inputting a fifth step timing signal to the driving circuit after inputting the fourth step timing signal to the driving circuit; and inputting a sixth step timing signal to the driving circuit after inputting the fifth step timing signal to the driving circuit.

Referring to FIG. 5, FIG. 6, FIG. 7, and FIG. 8, in the first step timing signal, a signal of the first global clearing signal line $L_{GRST1}$ is a high level, a signal of the second global clearing signal line $L_{GRST2}$ is a low level, a signal of the first clock line $L_{CLK}$ is a low level, a signal of the second clock line $L_{CLKB}$ is a high level, a signal of the reset line $L_{RST}$ is a low level, and each odd row of shifting unit outputs a low level signal under control of the first step timing signal. In the second step timing signal, a signal of the first global clearing signal line $L_{GRST1}$ is a low level, a signal of the second global clearing signal line $L_{GRST2}$ is a low level, a signal of the first clock line $L_{CLK}$ is a high level, a signal of the second clock line $L_{CLKB}$ is a low level, a signal of the reset line $L_{RST}$ is a low level, and each odd row of shifting unit outputs a high level signal under control of the second step timing signal. In the third step timing signal, a signal of the first global clearing signal line $L_{GRST1}$ is a low level, a signal of the second global clearing signal line $L_{GRST2}$ is a low level, a signal of the first clock line $L_{CLK}$ is a low level or a high level, a signal of the reset line $L_{RST}$ is a high level, and each odd row of shifting unit outputs a low level signal under control of the third step timing signal.

Figure 7:
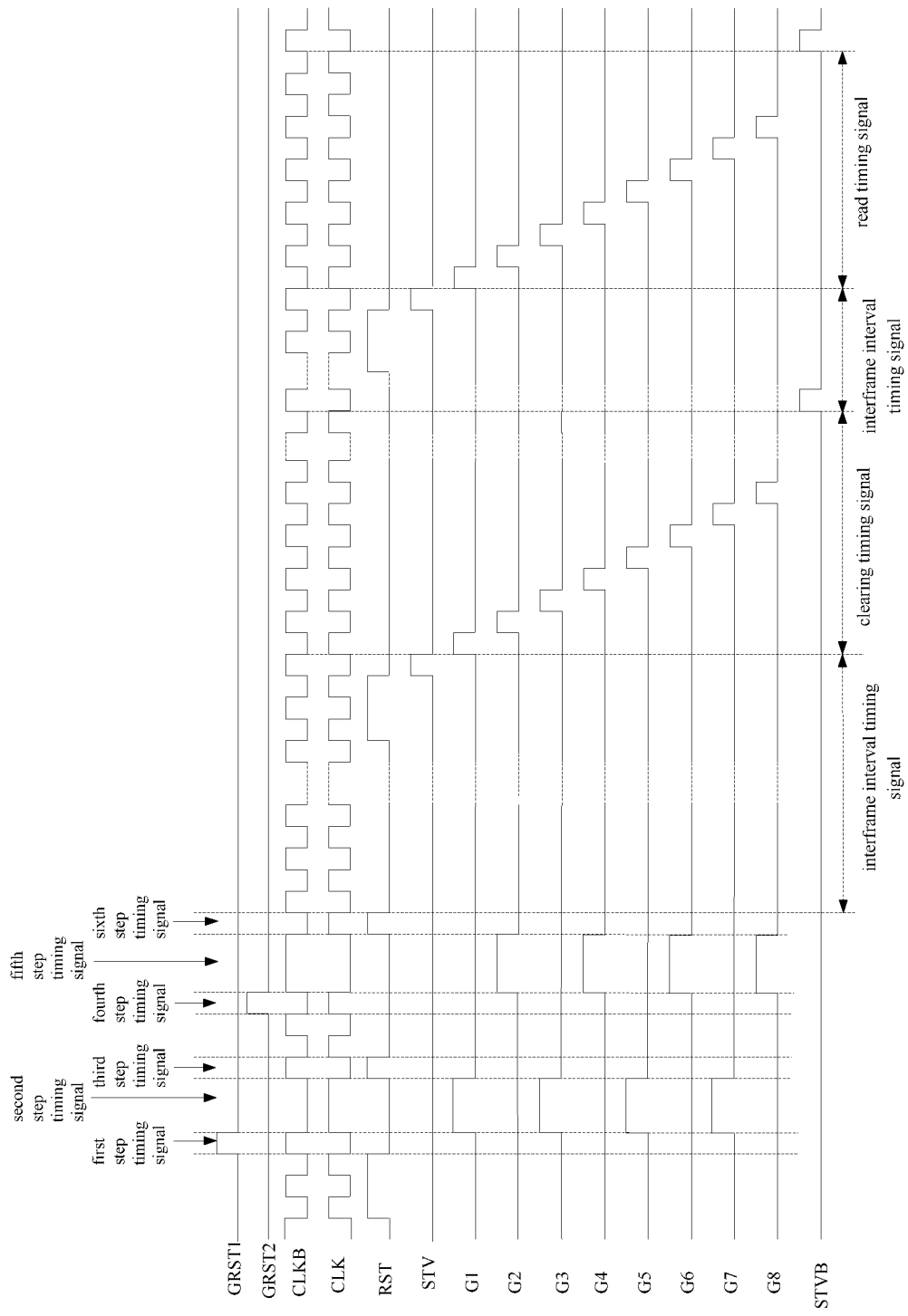
FIG. 7 schematically illustrates a timing diagram of a reset line, a first clock line, a second clock line, a continuous high level line, a continuous low level line, a first trigger line, a second trigger line, a first global clearing signal lines and a second global clearing signal lines according to another embodiment of the present disclosure.
Figure 8:
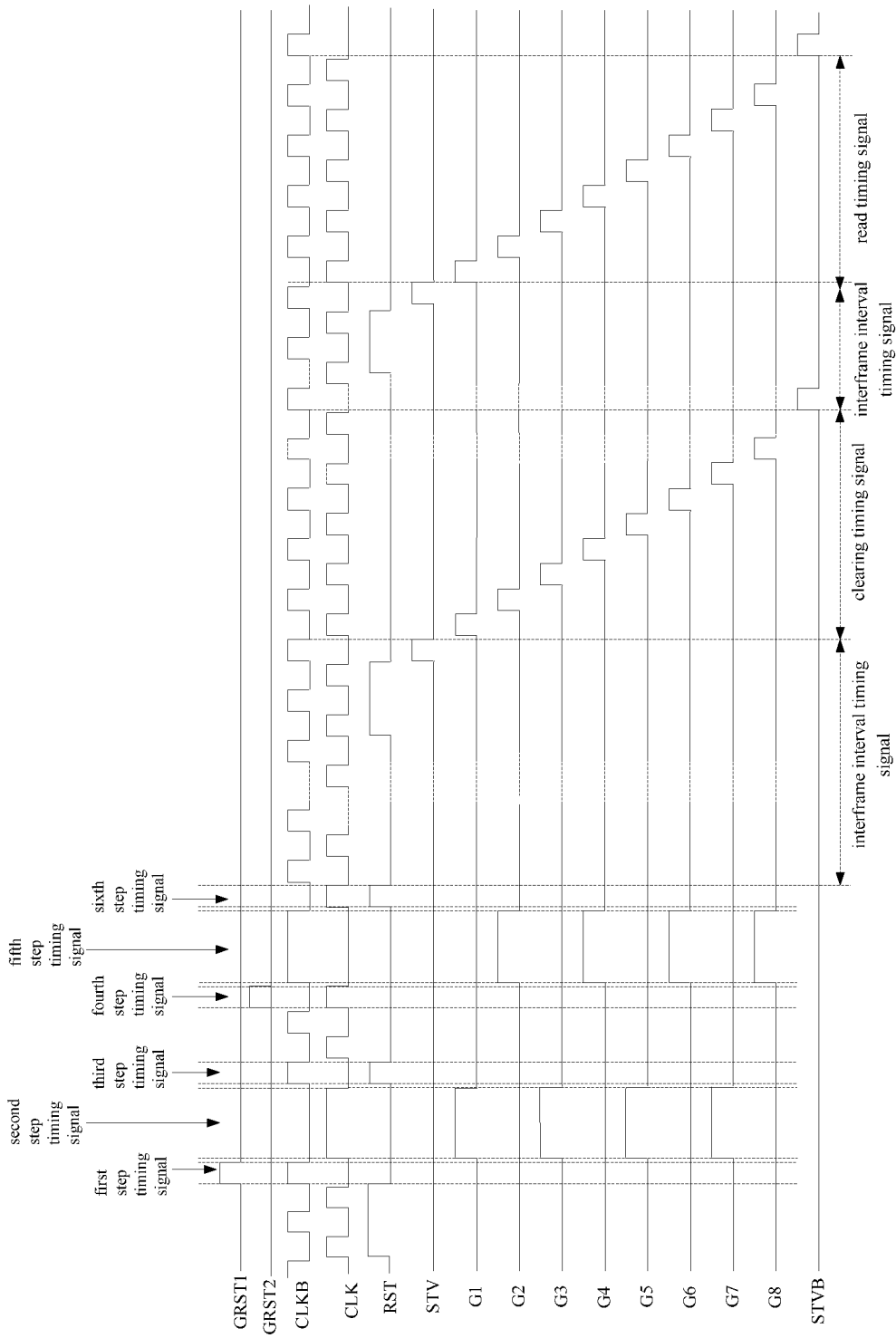
FIG. 8 schematically illustrates a timing diagram of a reset line, a first clock line, a second clock line, a continuous high level line, a continuous low level line, a first trigger line, a second trigger line, a first global clearing signal lines and a second global clearing signal lines according to another embodiment of the present disclosure.

In FIG. 7 and FIG. 8, in the first sub-global clearing timing signal, the signal of the first clock line $L_{CLK}$ has a high level period longer than a low level period, and the second step timing signal has a duration longer than the first step timing signal and the third step timing signal, thereby increasing duration of the high level signal output by each odd row of shifting unit, and improving efficiency of clearing the residual signal of the plurality of odd rows of pixel units simultaneously by each odd row of shifting unit.

Referring to FIG. 7, in the global clearing timing signal, there is no time interval between a high level signal of the first clock line $L_{CLK}$ and a high level signal of the second clock line $L_{CLKB}$ that is adjacent to the high level signal of the first clock line $L_{CLK}$. That is, in the global clearing timing signal, when a signal of the first clock line $L_{CLK}$ is a high level, a signal of the second clock line $L_{CLKB}$ is a low level, and when the signal of the first clock line $L_{CLK}$ is a low level, the signal of the second clock line $L_{CLKB}$ is a high level.

Referring to FIG. 8, in the global clearing timing signal, there is a time interval between a high level signal of the first clock line $L_{CLK}$ and a high level signal of the second clock line $L_{CLKB}$ that is adjacent to the high level signal of the first clock line Lax, so that the signal of the first clock line $L_{CLK}$ and the signal of the second clock line $L_{CLKB}$ will not vary simultaneously, avoiding a unstable state of the output of the driving circuit.

Referring to FIG. 8, a time interval between the second step timing signal and the first step timing signal is equal to the time interval between the high level signal in the first clock line $L_{CLK}$ and the high level signal in the second clock line $L_{CLKB}$ that is adjacent to the high level signal in the first clock line $L_{CLK}$. A time interval between the third step timing signal and the second step timing signal is equal to the time interval between the high level signal in the first clock line $L_{CLK}$ and the high level signal in the second clock line $L_{CLKB}$ that is adjacent to the high level signal in the first clock line $L_{CLK}$.

In FIG. 8, the signal of the first clock line $L_{CLK}$ and the signal of the second clock line $L_{CLKB}$ are both at a low level in the time interval between the high level signal of the first clock line $L_{CLK}$ and the high level signal of the second clock line $L_{CLKB}$ that is adjacent to the high level signal of the first clock line $L_{CLK}$.

Figure 9:
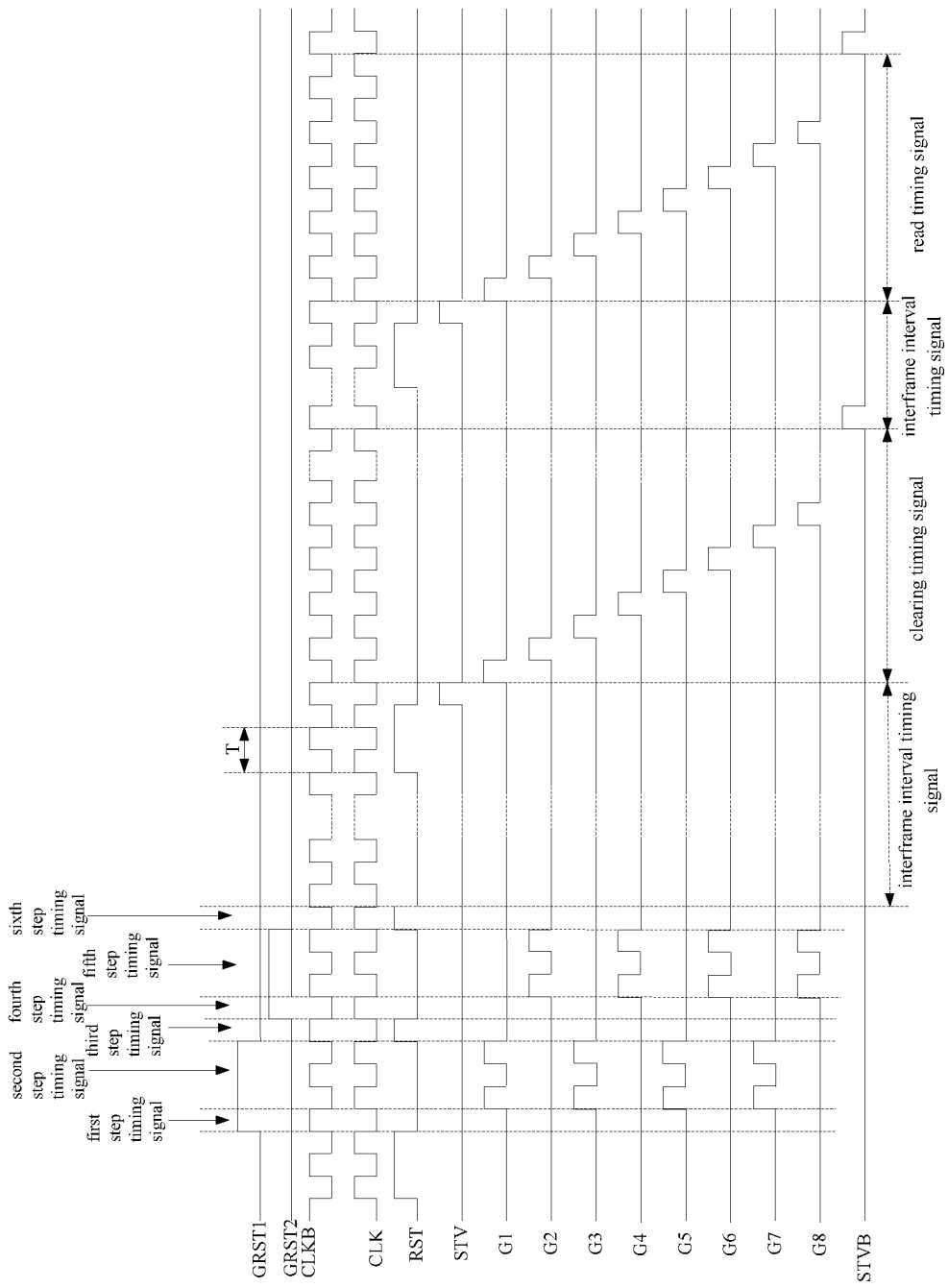
FIG. 9 schematically illustrates a timing diagram of a reset line, a first clock line, a second clock line, a continuous high level line, a continuous low level line, a first trigger line, a second trigger line, a first global clearing signal lines, and a second global clearing signal lines according to another embodiment of the present disclosure.

Referring to FIG. 9 and FIG. 10, in the first step timing signal, a signal of the first global clearing signal line $L_{GRST1}$ is a high level, a signal of the second global clearing signal line $L_{GRST2}$ is a low level, a signal of the first clock line $L_{CLK}$ is a low level, a signal of the second clock line $L_{CLKB}$ is a high level, a signal of the reset line $L_{RST}$ is a low level, and each odd row of shifting unit outputs a low level signal under control of the first step timing signal. In the second step timing signal, a signal of the first global clearing signal line $L_{GRST1}$ is a high level, a signal of the second global clearing signal line $L_{GRST2}$ is a low level, a signal of the first clock line $L_{CLK}$ includes a plurality of high levels, a signal of the second clock line $L_{CLKB}$ includes a plurality of low levels, a signal of the reset line $L_{RST}$ is a low level, and each odd row of shifting unit outputs a plurality of high level signals under control of the second step timing signal. In the third step timing signal, a signal of the first global clearing signal line $L_{GRST1}$ is a low level, a signal of the second global clearing signal line $L_{GRST2}$ is a low level, a signal of the first clock line $L_{CLK}$ is a low level or a high level, a signal of the reset line $L_{RST}$ is a high level, and each odd row of shifting unit outputs a low level signal under control of the third step timing signal. The periods of high level signals output by each odd row of shifting unit under the control of the second step timing signal correspond to the periods of the plurality of high levels in the signal of the first clock line $L_{CLK}$.

It should be noted that, in FIG. 9, in the second step timing signal, the signal of the first clock line $L_{CLK}$ may include two high levels, and the signal of the second clock line $L_{CLKB}$ may include two low levels correspondingly. In other embodiments, the signal of the first clock line $L_{CLK}$ may include three or more high levels, and the signal of the second clock line $L_{CLKB}$ may include three or more low levels correspondingly.

It should be noted that, in FIG. 10, in the second step timing signal, the signal of the first clock line $L_{CLK}$ may include two high levels. In other embodiments, the signal of the first clock line $L_{CLK}$ may include three or more high levels.

Referring to FIG. 5, FIG. 6, FIG. 9 and FIG. 10, in the global clearing timing signal, the signal of the first clock line $L_{CLK}$ and the signal of the second clock line $L_{CLKB}$ both have a characteristic period T, and a high level period of the signal of the first clock line $L_{CLK}$ is equal to a high level period of the signal of the second clock line $L_{CLKB}$.

Figure 5:
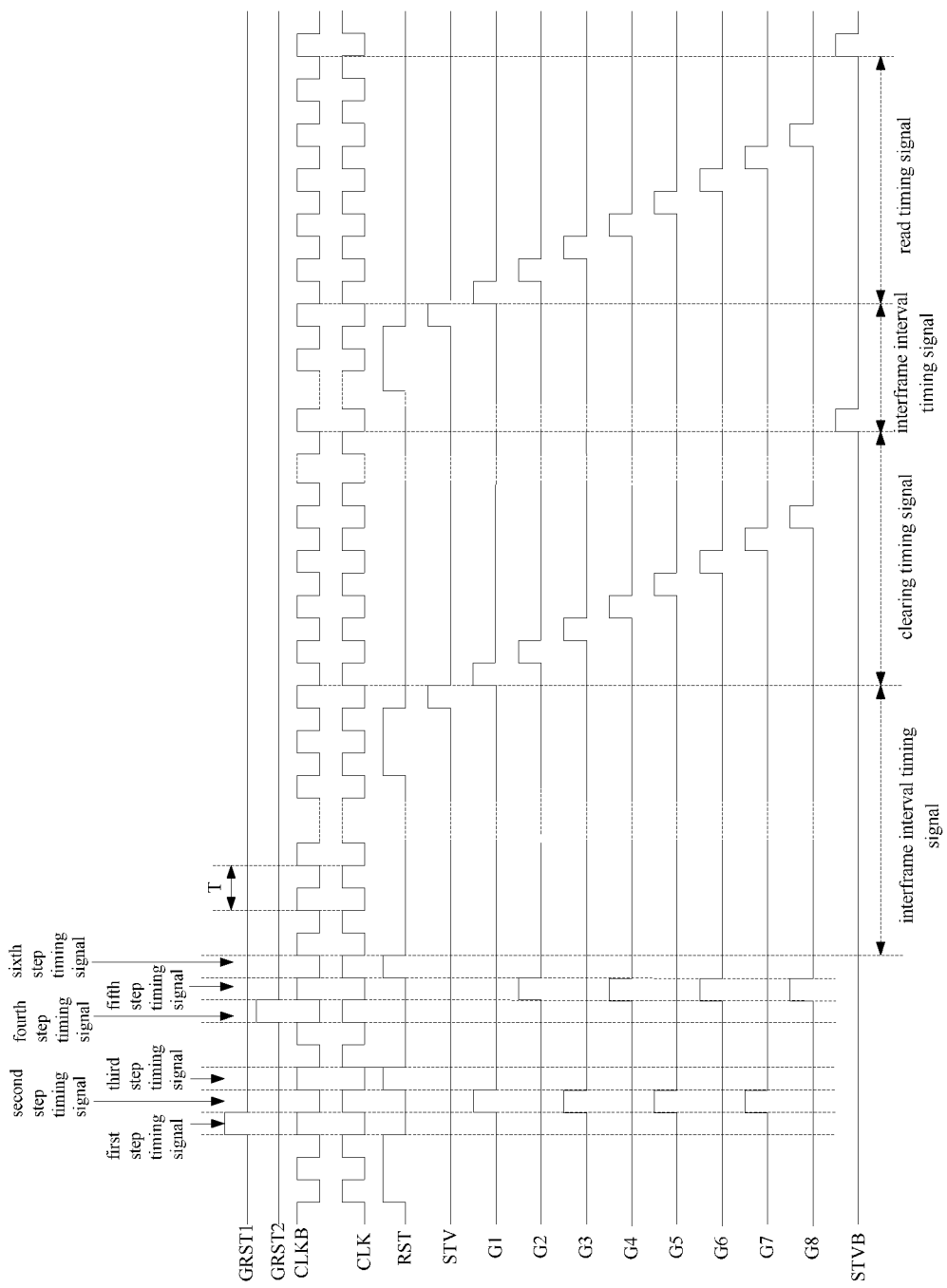
FIG. 5 schematically illustrates a timing diagram of a reset line, a first clock line, a second clock line, a continuous high level line, a continuous low level line, a first trigger line, a second trigger line, a first global clearing signal line and a second global clearing signal line according to an embodiment of the present disclosure.

Referring to FIG. 5 and FIG. 9, in the global clearing timing signal, a high level period of the signal of the first clock line $L_{CLK}$ is one half of the characteristic period T, and a high level period of the signal of the second clock line $L_{CLKB}$ is one half of the characteristic period T.

Referring to FIG. 5 and FIG. 9, in the global clearing timing signal, there is no time interval between a high level signal in the first clock line $L_{CLK}$ and a high level signal in the second clock line $L_{CLKB}$ that is adjacent to the high level signal in the first clock line $L_{CLK}$. That is, in the global clearing timing signal, when a signal of the first clock line $L_{CLK}$ is a high level, a signal of the second clock line $L_{CLKB}$ is a low level, and when the signal of the first clock line $L_{CLK}$ is a low level, the signal of the second clock line $L_{CLKB}$ is a high level.

Referring to FIG. 5 and FIG. 9, in the third step timing signal, a signal of the first clock line $L_{CLK}$ is a low level, and a signal of the second clock line $L_{CLKB}$ is a high level.

Referring to FIG. 5 and FIG. 9, the first step timing signal, the second step timing signal and the third step timing signal may be continuous, and under the control of the second step timing signal, a high level period of the signal output by each odd row of shifting unit may be one half of the characteristic period T, and the high level periods of the signal output by each odd row of shifting unit correspond to the high level periods of the first clock line $L_{CLK}$ in the second step timing signal.

Figure 6:
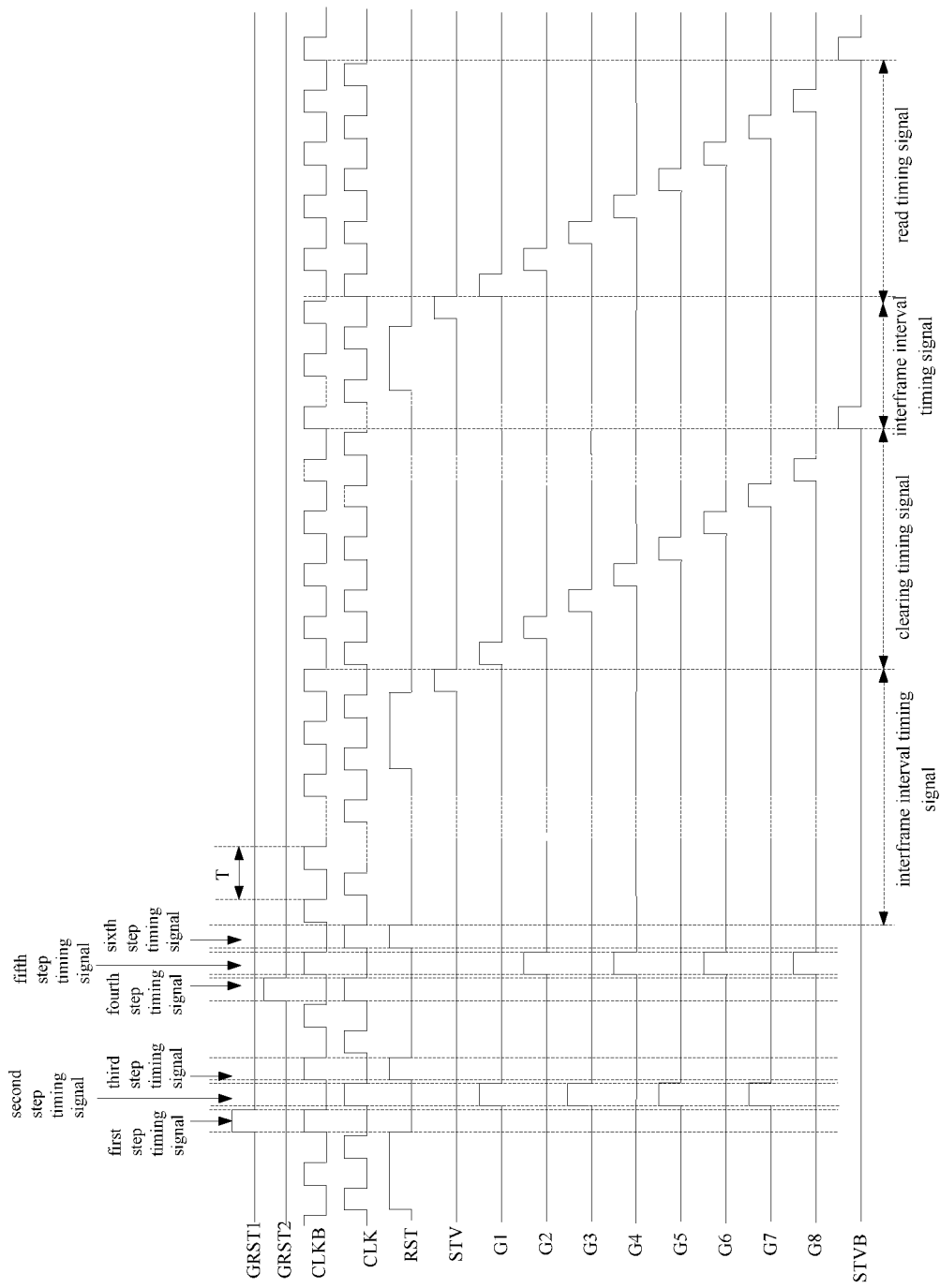
FIG. 6 schematically illustrates a timing diagram of a reset line, a first clock line, a second clock line, a continuous high level line, a continuous low level line, a first trigger line, a second trigger line, a first global clearing signal lines and a second global clearing signal lines according to another embodiment of the present disclosure.

Referring to FIG. 6 and FIG. 10, in the global clearing timing signal, a high level period of the signal of the first clock line $L_{CLK}$ is shorter than one half of the characteristic period T, and a high level period of the signal of the second clock line $L_{CLKB}$ is shorter than one half of the characteristic period T; and in the global clearing timing signal, there is a time interval between a high level signal of the first clock line $L_{CLK}$ and a high level signal of the second clock line $L_{CLKB}$ that is adjacent to the high level signal of the first clock line $L_{CLK}$.

Referring to FIG. 6 and FIG. 10, there is a time interval between a high level signal of the first clock line $L_{CLK}$ and a high level signal of the second clock line $L_{CLKB}$ that is adjacent to the high level signal of the first clock line $L_{CLK}$, so that the signal of the first clock line $L_{CLK}$ and the signal of the second clock line $L_{CLKB}$ will not vary simultaneously, avoiding a unstable state of the output of the driving circuit.

Referring to FIG. 6 and FIG. 10, a time interval between the second step timing signal and the first step timing signal may be equal to the time interval between a high level signal in the first clock line $L_{CLK}$ and a high level signal in the second clock line $L_{CLKB}$ that is adjacent to the high level signal in the first clock line $L_{CLK}$. A time interval between the third step timing signal and the second step timing signal may be equal to a time interval between a high level signal in the first clock line $L_{CLK}$ and a high level signal in the second clock line $L_{CLKB}$ that is adjacent to the high level signal in the first clock line $L_{CLK}$.

Referring to FIG. 6 and FIG. 10, a signal of the first clock line $L_{CLK}$ and a signal of the second clock line $L_{CLKB}$ are both at a low level, in the time interval between a high level signal of the first clock line $L_{CLK}$ and a high level signal of the second clock line $L_{CLKB}$ that is adjacent to the high level signal in the first clock line $L_{CLK}$.

Referring to FIG. 6 and FIG. 10, the first step timing signal, the second step timing signal and the third step timing signal are discontinuous. Under the control of the second step timing signal, a high level period of the signal output by each odd row of shifting unit is shorter than one half of the characteristic period, and the high level periods of the signal output by each odd row of shifting unit correspond to the high level periods of the first clock line $L_{CLK}$ in the second step timing signal.

Similarly, referring to FIG. 5, FIG. 6, FIG. 7, and FIG. 8, in the second sub-global clearing timing signal, in the fourth step timing signal, a signal of the first global clearing signal line $L_{GRST1}$ is a low level, a signal of the second global clearing signal line $L_{GRST2}$ is a high level, a signal of the first clock line $L_{CLK}$ is a high level, a signal of the second clock line $L_{CLKB}$ is a low level, a signal of the reset line $L_{RST}$ is a low level, and each even row of shifting unit outputs a low level signal under control of the fourth step timing signal; in the fifth step timing signal, a signal of the first global clearing signal line $L_{GRST1}$ is a low level, a signal of the second global clearing signal line $L_{GRST2}$ is a low level, a signal of the second clock line $L_{CLKB}$ is a high level, a signal of the first clock line $L_{CLK}$ is a low level, a signal of the reset line $L_{RST}$ is a low level, and each even row of shifting unit outputs a high level signal under control of the fifth step timing signal; in the sixth step timing signal, a signal of the first global clearing signal line $L_{GRST1}$ is a low level, a signal of the second global clearing signal line $L_{GRST2}$ is a low level, a signal of the second clock line $L_{CLKB}$ is a low level or a high level, a signal of the reset line $L_{RST}$ is a high level; and each even row of shifting unit is configured to output a high level signal under control of the fifth step timing signal, and each even row of shifting unit is configured to output a low level signal under control of the sixth step timing signal.

In FIG. 7 and FIG. 8, in the second sub-global clearing timing signal, a high level period of the signal of the second clock line $L_{CLKB}$ has a high level period longer than a low level period, and the fifth step timing signal has a duration longer than the fourth step timing signal and the sixth step timing signal, thereby increasing duration of a high level signal output by each even row of shifting unit, and improving efficiency of simultaneously clearing residual signals of each even row of pixel units by each even row of shifting unit.

Referring to FIG. 8, a time interval between the fifth step timing signal and the fourth step timing signal may be equal to the time interval between a high level signal of the first clock line $L_{CLK}$ and a high level signal of the second clock line $L_{CLKB}$ that is adjacent to the high level signal in the first clock line $L_{CLK}$; and a time interval between the sixth step timing signal and the fifth step timing signal may be equal to the time interval between a high level signal of the first clock line $L_{CLK}$ and a high level signal of the second clock line $L_{CLKB}$ that is adjacent to the high level signal of the first clock line $L_{CLK}$.

Referring to FIG. 9 and FIG. 10, in the fourth step timing signal, a signal of the first global clearing signal line $L_{GRST1}$ may be a low level, a signal of the second global clearing signal line $L_{GRST2}$ may be a high level, a signal of the first clock line $L_{LCK}$ is a high level, and a signal of the second clock line $L_{LCKB}$ is a low level, a signal of the reset line $L_{RST}$ is a low level, and each even row of shifting unit outputs a low level signal under control of the fourth step timing signal; in the fifth step timing signal, a signal of the first global clearing signal line $L_{GRST1}$ is a low level, a signal of the second global clearing signal line $L_{GRST2}$ is a high level, a signal of the second clock line $L_{CLKB}$ includes a plurality of high levels, a signal of the first clock line $L_{CLK}$ includes a plurality of low levels, a signal of the reset line $L_{RST}$ is a low level, each even row of shifting unit outputs a plurality of high level signals under control of the fifth step timing signal, and the periods of high level signals output by each even row of shifting unit under the control of the fifth step timing signal correspond to the periods of the plurality of high levels in the signal of the second clock line $L_{CLKB}$; in the sixth step timing signal, a signal of the first global clearing signal line $L_{GRST1}$ is a low level, a signal of the second global clearing signal line $L_{GRST2}$ is a low level, a signal of the second clock line $L_{CLKB}$ is a low level or a high level, a signal of the reset line $L_{RST}$ is a high level, and each even row of shifting unit outputs a low level signal under control of the sixth step timing signal.

It should be noted that, in FIG. 9, in the fifth step timing signal, the signal of the second clock line $L_{CLKB}$ may include two high levels, and the signal of the first clock line $L_{CLK}$ may include two low levels correspondingly. In other embodiments, the signal of the second clock line $L_{CLKB}$ may include three or more high levels, and the signal of the first clock line $L_{CLK}$ may include three or more low levels correspondingly.

It should be noted that, in FIG. 10, in the fifth step timing signal, the signal of the second clock line $L_{CLKB}$ may include two high levels. In other embodiments, the signal of the first clock line $L_{CLK}$ may include three or more high levels.

Referring to FIGS. 5 and 9, in the sixth step timing signal, the signal of the second clock line $L_{CLKB}$ may be a low level, and the signal of the first clock line $L_{CLK}$ may be a high level.

Referring to FIG. 5 and FIG. 9, the fourth step timing signal, the fifth step timing signal and the sixth step timing signal may be continuous, and under the control of the fifth step timing signal, a high level period of the signal output by each even row of shifting unit may be one half of the characteristic period T, and the high level periods of the signal output by each even row of shifting unit correspond to the high level periods of the second clock line $L_{CLKB}$ in the fifth step timing signal.

Referring to FIG. 6 and FIG. 10, a time interval between the fifth step timing signal and the fourth step timing signal may be equal to the time interval between a high level signal in the first clock line $L_{CLK}$ and a high level signal in the second clock line $L_{CLKB}$ that is adjacent to the high level signal in the first clock line $L_{CLK}$. A time interval between the sixth step timing signal and the fifth step timing signal may be equal to a time interval between a high level signal in the first clock line $L_{CLK}$ and a high level signal in the second clock line $L_{CLKB}$ that is adjacent to the high level signal in the first clock line $L_{CLK}$.

Referring to FIG. 6 and FIG. 10, the fourth step timing signal, the fifth step timing signal and the sixth step timing signal may be discontinuous. Under the control of the fifth step timing signal, a high level period of the signal output by each even row of shifting unit is shorter than one half of the characteristic period, and the high level periods of the signal output by each even row of shifting unit correspond to the high level periods of the second clock line $L_{CLKB}$ in the fifth step timing signal.

As can be seen from the above description and the schematic diagrams of FIG. 5, FIG. 6, FIG. 7, FIG. 8, FIG. 9 and FIG. 10, the first global clearing signal line $L_{GRST1}$ and the second global clearing signal line $L_{GRST2}$ function as triggers for triggering the first global clearing timing and the second global clearing timing.

The first clock line $L_{CLK}$ and the second clock line $L_{CLKB}$ play a driving role, and the high level period of the first clock line $L_{CLK}$ in the first sub-global clearing timing signal determines the high level period of the signal output by each odd row of shifting unit. The high level period of the second clock line $L_{CLKB}$ in the second sub-global clearing timing signal determines the high level period of the signal output by each even row of shifting unit.

The reset line $L_{RST}$, the first clock line $L_{CLK}$, the second clock line $L_{CLKB}$, the first trigger line $L_{STV}$, the first global clearing signal line $L_{GRST1}$ and the second global clearing signal line $L_{GRST2}$ are also applied to input a read timing signal to the driving circuit 21 after inputting the global clearing timing signal. Under control of the read timing signal, the output signal of the driving circuit 21 is applied to turn on the pixel units 31 row by row.

In some embodiment, in the N-th shifting unit, when the gate of the second transistor T2 is connected with the second trigger line $L_{STVB}$, correspondingly the reset line $L_{RST}$, the first clock line $L_{CLK}$, the second clock line $L_{CLKB}$, the first trigger line $L_{STV}$, the second trigger line $L_{STVB}$, the first global clearing signal line $L_{GRST1}$ and the second global clearing signal line $L_{GRST2}$ are applied to input the read timing signal to the driving circuit 21.

In the read timing signal, signals of the first global clearing signal line $L_{GRST1}$ and the second global clearing signal line $L_{GRST2}$ are both at a low level, and the tenth transistor T10 in each row of shifting unit is in an off state.

Under the control of the read timing signal, the i-th output terminal outputs the output signal of the i-th row of shifting unit to the i-th row of the driving line 41, and meanwhile turns off output of the previous row of shifting unit and triggers output of the next row of shifting unit.

Under the control of the read timing signal, the first trigger signal STV is used to trigger the first row of shifting unit to output signals.

In some embodiment, under the control of the read timing signal, the second trigger signal STVB is applied to turn off output of the N-th row of shifting unit. When the gate of the second transistor T2 is connected with the continuous low level line $L_{VL}$, a part of the signal in the reset line $L_{RST}$ is applied to turn off output of the N-th row of shifting unit.

It should be noted that, the reset line $L_{RST}$, the first clock line Lax, the second clock line $L_{CLKB}$, the first trigger line $L_{STV}$, the first global clearing signal line $L_{GRST1}$, and the second global clearing signal line $L_{GRST2}$ are also applied to input an interframe interval timing signal to the driving circuit 21 after inputting the global clearing timing signal and before inputting the read timing signal.

It should be noted that, the reset line $L_{RST}$, the first clock line Lax, the second clock line $L_{CLKB}$, the first trigger line $L_{STV}$, the first global clearing signal line $L_{GRST1}$ and the second global clearing signal line $L_{GRST2}$ are also applied to input a clearing timing signal to the driving circuit 21 after inputting the global clearing timing signal and before inputting the read timing signal, and under the control of the clearing timing signal, the driving circuit 21 clears the residual signals in the pixel units row by row. In other embodiments, the reset line $L_{RST}$, the first clock line $L_{CLK}$, the second clock line $L_{CLKB}$, the first trigger line $L_{STV}$, the first global clearing signal line $L_{GRST1}$ and the second global clearing signal line $L_{GRST2}$ are not applied to input the clearing timing signal for clearing the pixel units row by row to the driving circuit 21.

Correspondingly, a method for forming the aforementioned array sensor is also provided according to embodiments of the present disclosure. The method may include: forming a sensor circuit, where the sensor circuit may include an array of pixel units, the array of pixel units may include N rows of pixel units, and N is an integer greater than or equal to 1; and forming a driving circuit, where forming the driving circuit may include forming at least N rows of shifting units, an output signal of an i-th row of shifting unit is applied to control opening of an i-th row of pixel unit, and i is an integer greater than or equal to 1 and less than or equal to N; where forming the driving circuit may further include forming a first global clearing signal line, the first global clearing signal line is connected with a plurality of odd rows of shifting units respectively, and a signal in the first global clearing signal line is applied to trigger the plurality of odd rows of shifting units to simultaneously turn on a plurality of odd rows of pixel units, so that the plurality of odd rows of pixel units simultaneously discharge residual charge; and where forming the driving circuit may further include forming a second global clearing signal line, the second global clearing signal line is connected with a plurality of even rows of shifting units respectively, and a signal in the second global clearing signal line is applied to trigger the plurality of even rows of shifting units to simultaneously turn on a plurality of even rows of pixel units, so that the plurality of even rows of pixel units simultaneously discharge residual charge.

Although the present disclosure has been disclosed above, the present disclosure is not limited thereto. It should be understood by those skilled in the art that various changes and modifications may be made without departing from the spirit and scope of the disclosure, and therefore, the scope of the disclosure should be limited by the scope of the claims.

The invention claimed is:

1. An array sensor, comprising:
    a sensor circuit, the sensor circuit comprising an array of pixel units, the array of pixel units comprising N rows of pixel units, and N being an integer greater than or equal to 1; and
    a driving circuit, the driving circuit comprising at least N rows of shifting units, an output signal of an i-th row of shifting unit being applied to control opening of an i-th row of pixel units, and i being an integer greater than or equal to 1 and less than or equal to N;
    wherein the driving circuit further comprises a first global clearing signal line, the first global clearing signal line is connected with a plurality of odd rows of shifting units respectively, and a signal of the first global clearing signal line is applied to trigger the plurality of odd rows of shifting units to simultaneously turn on a plurality of odd rows of pixel units, so that the plurality of odd rows of pixel units simultaneously discharge residual charge; and wherein the driving circuit further comprises a second global clearing signal line, the second global clearing signal line is connected with a plurality of even rows of shifting units respectively, and a signal of the second global clearing signal line is applied to trigger the plurality of even rows of shifting units to simultaneously turn on a plurality of even rows of pixel units, so that the plurality of even rows of pixel units simultaneously discharge residual charge,
    wherein the driving circuit further comprises a reset line, a first clock line, a second clock line, a continuous high level line, a continuous low level line, a first trigger line and a second trigger line.

2. The array sensor according to claim 1, wherein each row of shifting unit comprises: a first transistor, a second transistor, a third transistor, a fourth transistor, a fifth transistor, a sixth transistor, a seventh transistor, an eighth transistor, a ninth transistor, a tenth transistor, a first capacitor and a second capacitor, each of transistors from the first transistor to the tenth transistor has a first electrode and a second electrode, the first electrode is a source and the second electrode is a drain, or the first electrode is a drain and the second electrode is a source, and the first capacitor and the second capacitor each have a first terminal and a second terminal opposite to each other;
    in the each row of shifting unit, the first terminal of the second capacitor is connected with the second electrode of the first transistor, the first electrode of the second transistor, the first electrode of the third transistor, the first electrode of the sixth transistor, a gate of the fourth transistor, a gate of the fifth transistor, and the second electrode of the tenth transistor, the first terminal of the first capacitor is connected with a gate of the third transistor, a gate of the seventh transistor and the first electrode of the fifth transistor, the second terminal of the first capacitor is connected with the first electrode of the fourth transistor, the reset line is connected with both a gate of the sixth transistor and a gate of the ninth transistor, and the continuous low level line is connected with the second electrode of the second transistor, the second electrode of the third transistor, the second electrode of the fifth transistor, the second electrode of the sixth transistor, the second electrode of the seventh transistor, the second electrode of the eighth transistor and the second electrode of the ninth transistor; in the i-th row of shifting unit, the second terminal of the second capacitor is connected with the second electrode of the fourth transistor, the first electrode of the seventh transistor, the first electrode of the eighth transistor and the first electrode of the ninth transistor at a connection point of an i-th output terminal, and the i-th output terminal is configured to output the output signal of the i-th row of shifting unit to the i-th row of pixel units; a gate of the first transistor in a first row of shifting unit is connected with the first trigger line; in the each row of shifting unit, the continuous high level line is connected with both the first electrode of the first transistor and the first electrode of the tenth transistor; a gate of the second transistor in a (k−1)-th row of shifting unit is connected with a k-th output terminal, a gate of the first transistor in a k-th row of shifting unit is connected with a (k−1)-th output terminal, k is an integer greater than or equal to 2 and less than or equal to N; and, in an N-th row of shifting unit, a gate of the second transistor is connected with the second trigger line, or the gate of the second transistor is connected with the continuous low level line, or the gate of the second transistor is connected with the reset line; and in each odd row of shifting unit, the first clock line is connected with the second terminal of the first capacitor and the first electrode of the fourth transistor, the second clock line is connected with a gate of the eighth transistor, and the first global clearing signal line is connected with a gate of the tenth transistor; in each even row of shifting unit, the second clock line is connected with the second terminal of the first capacitor and the first electrode of the fourth transistor, the first clock line is connected with a gate of the eighth transistor, and the second global clearing signal line is connected with a gate of the tenth transistor.

3. The array sensor according to claim 2, wherein each of the first transistor, the second transistor, the third transistor, the fourth transistor, the fifth transistor, the sixth transistor, the seventh transistor, the eighth transistor, the ninth transistor and the tenth transistor comprises an N-type thin film transistor.

4. The array sensor according to claim 2, wherein in the N-th row of shifting unit, when the gate of the second transistor is connected with the second trigger line, a signal of the second trigger line is applied to turn off an output of the N-th row of shifting unit; or in the N-th row of shifting unit, when the gate of the second transistor is connected with the continuous low level line or the reset line, a part of signal of the reset line is applied to turn off the output of the N-th row of shifting unit.

5. A method for operating the array sensor according to claim 1, comprising:

inputting a global clearing timing signal to the driving circuit, wherein inputting the global clearing timing signal to the driving circuit comprises: inputting a first sub-global clearing timing signal and a second sub-global clearing timing signal to the driving circuit in sequence;

under control of the first sub-global clearing timing signal, triggering, by the signal of the first global clearing signal line, the plurality of odd rows of shifting units to simultaneously turn on the plurality of odd rows of pixel units, so that the plurality of odd rows of pixel units simultaneously discharge residual charge; and under control of the second sub-global clearing timing signal, triggering, by the signal of the second global clearing signal line, the plurality of even rows of shifting units to simultaneously turn on the plurality of even rows of pixel units, so that the plurality of even rows of pixel units simultaneously discharge residual charge.

6. The method for operating the array sensor according to claim 5, wherein each row of shifting unit comprises: a first transistor, a second transistor, a third transistor, a fourth transistor, a fifth transistor, a sixth transistor, a seventh transistor, an eighth transistor, a ninth transistor, a tenth transistor, a first capacitor and a second capacitor, each of transistors from the first transistor to the tenth transistor has a first electrode and a second electrode, the first electrode is a source and the second electrode is a drain, or the first electrode is a drain and the second electrode is a source, and the first capacitor and the second capacitor respectively have a first terminal and a second terminal opposite to each other;

in the each row of shifting unit, the first terminal of the second capacitor is connected with the second electrode of the first transistor, the first electrode of the second transistor, the first electrode of the third transistor, the first electrode of the sixth transistor, a gate of the fourth transistor, a gate of the fifth transistor, and the second electrode of the tenth transistor, the first terminal of the first capacitor is connected with a gate of the third transistor, a gate of the seventh transistor and the first electrode of the fifth transistor, the second terminal of the first capacitor is connected with the first electrode of the fourth transistor, the reset line is connected with both a gate of the sixth transistor and a gate of the ninth transistor, and the continuous low level line is connected with the second electrode of the second transistor, the second electrode of the third transistor, the second electrode of the fifth transistor, the second electrode of the sixth transistor, the second electrode of the seventh transistor, the second electrode of the eighth transistor and the second electrode of the ninth transistor; in the i-th row of shifting unit, the second terminal of the second capacitor is connected with the second electrode of the fourth transistor, the first electrode of the seventh transistor, the first electrode of the eighth transistor and the first electrode of the ninth transistor at a connection point of an i-th output terminal, and the i-th output terminal is configured to output the output signal of the i-th row of shifting unit to the i-th row of pixel units; a gate of the first transistor in a first row of shifting unit is connected with the first trigger line; in the each row of shifting unit, the continuous high level line is connected with both the first electrode of the first transistor and the first electrode of the tenth transistor; a gate of the second transistor in a (k−1)-th row of shifting unit is connected with a k-th output terminal, a gate of the first transistor in a k-th row of shifting unit is connected with the (k−1)-th output terminal, k is an integer greater than or equal to 2 and less than or equal to N; and, in an N-th row of shifting unit, a gate of the second transistor is connected with the second trigger line, or the gate of the second transistor is connected with the continuous low level line, or the gate of the second transistor is connected with the reset line; and in the plurality of odd rows of shifting units, the first clock line is connected with the second terminal of the first capacitor and the first electrode of the fourth transistor, the second clock line is connected with a gate of the eighth transistor, and the first global clearing signal line is connected with a gate of the tenth transistor; in the plurality of even rows of shifting units, the second clock line is connected with the second terminal of the first capacitor and the first electrode of the fourth transistor, the first clock line is connected with a gate of the eighth transistor, and the second global clearing signal line is connected with a gate of the tenth transistor; and inputting, by the reset line, the first clock line, the second clock line, the first trigger line, the first global clearing signal line and the second global clearing signal line, the global clearing timing signal to the driving circuit; under the control of the first sub-global clearing timing signal, an output signal of the driving circuit simultaneously turns on the plurality of odd rows of pixel units;

under the control of the second sub-global clearing timing signal, an output signal of the driving circuit simultaneously turns on the plurality of even rows of pixel units.

7. The method for operating the array sensor according to claim 6, wherein in the global clearing timing signal, a signal of the first trigger line is a low level, and the first transistor in the first row of shifting unit is in an off state.

8. The method for operating the array sensor according to claim 6, wherein inputting the first sub-global clearing timing signal comprises: inputting a first step timing signal to the driving circuit; inputting a second step timing signal to the driving circuit after inputting the first step timing signal to the driving circuit; inputting a third step timing signal to the driving circuit after inputting the second step timing signal to the driving circuit; and in the first step timing signal, a signal of the first global clearing signal line is a high level, a signal of the second global clearing signal line is a low level, a signal of the first clock line is a low level, a signal of the second clock line is a high level, a signal of the reset line is a low level, and each odd row of shifting unit outputs a low level signal under control of the first step timing signal; in the second step timing signal, a signal of the first global clearing signal line is a low level, a signal of the second global clearing signal line is a low level, a signal of the first clock line is a high level, a signal of the second clock line is a low level, a signal of the reset line is a low level, and each odd row of shifting unit outputs a high level signal under control of the second step timing signal; in the third step timing signal, a signal of the first global clearing signal line is a low level, a signal of the second global clearing signal line is a low level, a signal of the first clock line is a low level or a high level, a signal of the reset line is a high level, and each odd row of shifting unit outputs a low level signal under control of the third step timing signal.

9. The method for operating the array sensor according to claim 8, wherein in the global clearing timing signal, a signal of the first clock line is a high level and a signal of the second clock line is a low level, or the signal of the second clock line is a high level and the signal of the first clock line is a low level; and in the first sub-global clearing timing signal, the signal of the first clock line has a high level period longer than a low level period, and the second step timing signal has a duration longer than the first step timing signal and the third step timing signal.

10. The method for operating the array sensor according to claim 6, wherein inputting the first sub-global clearing timing signal comprises: inputting a first step timing signal to the driving circuit; inputting a second step timing signal to the driving circuit after inputting the first step timing signal to the driving circuit; inputting a third step timing signal to the driving circuit after inputting the second step timing signal to the driving circuit; and in the first step timing signal, a signal of the first global clearing signal line is a high level, a signal of the second global clearing signal line is a low level, a signal of the first clock line is a low level, a signal of the second clock line is a high level, a signal of the reset line is a low level, and each odd row of shifting unit outputs a low level signal under control of the first step timing signal; in the second step timing signal, a signal of the first global clearing signal line is a high level, a signal of the second global clearing signal line is a low level, a signal of the first clock line comprises a plurality of high levels, a signal of the second clock line comprises a plurality of low levels, a signal of the reset line is a low level, and each odd row of shifting unit outputs a plurality of high level signals under control of the second step timing signal; and in the third step timing signal, a signal of the first global clearing signal line is a low level, a signal of the second global clearing signal line is a low level, a signal of the first clock line is a low level or a high level, a signal of the reset line is a high level, and each odd row of shifting unit outputs a low level signal under control of the third step timing signal.

11. The method for operating the array sensor according to claim 8, wherein in the global clearing timing signal, a signal of the first clock line is a high level and a signal of the second clock line is a low level, or the signal of the second clock line is a high level and the signal of the first clock line is a low level; and, in the global clearing timing signal, the signal of the first clock line and the signal of the second clock line both have a characteristic period, and a high level period of the signal of the first clock line is equal to a high level period of the signal of the second clock line.

12. The method for operating the array sensor according to claim 11, wherein in the global clearing timing signal, a high level period of the signal of the first clock line is one half of the characteristic period, a high level period of the signal of the second clock line is one half of the characteristic period; in the global clearing timing signal, there is no time interval between a high level signal of the first clock line and a high level signal of the second clock line that is adjacent to the high level signal of the first clock line; and in the third step timing signal, the signal of the first clock line is a low level, and a signal of the second clock line is a high level; and the first step timing signal, the second step timing signal and the third step timing signal are continuous, and under the control of the second step timing signal, a high level period of the signal output by each odd row of shifting unit is one half of the characteristic period.

13. The method for operating the array sensor according to claim 11, wherein in the global clearing timing signal, a high level period of the signal of the first clock line is shorter than one half of the characteristic period, a high level period of the signal of the second clock line is shorter than one half of the characteristic period; and in the global clearing timing signal, there is a time interval between a high level signal of the first clock line and a high level signal of the second clock line that is adjacent to the high level signal of the first clock line; and the first step timing signal, the second step timing signal and the third step timing signal are discontinuous, under the control of the second step timing signal, a high level period of the signal output by each odd row of shifting unit is shorter than one half of the characteristic period.

14. The method for operating the array sensor according to claim 6, wherein inputting the second sub-global clearing timing signal comprises: inputting a fourth step timing signal to the driving circuit; inputting a fifth step timing signal to the driving circuit after inputting the fourth step timing signal to the driving circuit; inputting a sixth step timing signal to the driving circuit after inputting the fifth step timing signal to the driving circuit; and in the fourth step timing signal, a signal of the first global clearing signal line is a low level, a signal of the second global clearing signal line is a high level, a signal of the first clock line is a high level, a signal of the second clock line is a low level, a signal of the reset line is a low level, and each even row of shifting unit outputs a low level signal under control of the fourth step timing signal; in the fifth step timing signal, a signal of the first global clearing signal line is a low level, a signal of the second global clearing signal line is a low level, a signal of the second clock line is a high level, a signal of the first clock line is a low level, a signal of the reset line is a low level, and each even row of shifting unit outputs a high level signal under control of the fifth step timing signal; in the sixth step timing signal, a signal of the first global clearing signal line is a low level, a signal of the second global clearing signal line is a low level, a signal of the second clock line is a low level or a high level, a signal of the reset line is a high level, and each even row of shifting unit outputs a low level signal under control of the sixth step timing signal.

15. The method for operating the array sensor according to claim 14, wherein in the global clearing timing signal, a signal of the first clock line is a high level and a signal of the second clock line is a low level, or a signal of the second clock line is a high level and a signal of the first clock line is a low level; and in the second sub-global clearing timing signal, the signal of the second clock line has a high level period longer than a low level period, and the fifth step timing signal has a duration longer than the fourth step timing signal and the sixth step timing signal.

16. The method for operating the array sensor according to claim 6, wherein inputting the second sub-global clearing timing signal comprises: inputting a fourth step timing signal to the driving circuit; inputting a fifth step timing signal to the driving circuit after inputting the fourth step timing signal to the driving circuit; inputting a sixth step timing signal to the driving circuit after inputting the fifth step timing signal to the driving circuit; and in the fourth step timing signal, a signal of the first global clearing signal line is a low level, a signal of the second global clearing signal line is a high level, a signal of the first clock line is a high level, a signal of the second clock line is a low level, a signal of the reset line is a low level, and each even row of shifting unit outputs a low level signal under control of the fourth step timing signal; in the fifth step timing signal, a signal of the first global clearing signal line is a low level, a signal of the second global clearing signal line is a high level, a signal of the second clock line comprises a plurality of high levels, a signal of the first clock line comprises a plurality of low levels, a signal of the reset line is a low level, and each even row of shifting unit outputs a plurality of high level signals under control of the fifth step timing signal; and in the sixth step timing signal, a signal of the first global clearing signal line is a low level, a signal of the second global clearing signal line is a low level, a signal of the second clock line is a low level or a high level, a signal of the reset line is a high level, and each even row of shifting unit outputs a low level signal under control of the sixth step timing signal.

17. The method for operating the array sensor according to claim 14, wherein in the global clearing timing signal, a signal of the first clock line is a high level and a signal of the second clock line is a low level, or a signal of the second clock line is a high level and a signal of the first clock line is a low level; and in the global clearing timing signal, the signal of the first clock line and the signal of the second clock line both have a characteristic period, and a high level period of the signal of the first clock line is equal to a high level period of the signal of the second clock line.

18. The method for operating the array sensor according to claim 17, wherein in the global clearing timing signal, a high level period of the signal of the first clock line is one half of the characteristic period; a high level period of the signal of the second clock line is one half of the characteristic period; in the global clearing timing signal, there is no time interval between a high level signal of the first clock line and a high level signal of the second clock line that is adjacent to the high level signal of the first clock line; and in the sixth step timing signal, the signal of the second clock line is a low level, and a signal of the first clock line is a high level; and the fourth step timing signal, the fifth step timing signal and the sixth step timing signal are continuous, under control of the fifth step timing signal, a high level period of the signal output by each even row of shifting unit is one half of the characteristic period.

19. The method for operating the array sensor according to claim 17, wherein in the global clearing timing signal, a high level period of the signal of the first clock line is shorter than one half of the characteristic period; a high level period of the signal of the second clock line is shorter than one half of the characteristic period; in the global clearing timing signal, there is a time interval between a high level signal of the first clock line and a high level signal of the second clock line that is adjacent to the high level signal of the first clock line; and the fourth step timing signal, the fifth step timing signal and the sixth step timing signal are discontinuous, under control of the fifth step timing signal, a high level period of the signal output by each even row of shifting unit is shorter than one half of the characteristic period.

20. A method for forming the array sensor according to claim 1, comprising:

forming a sensor circuit, wherein the sensor circuit comprises an array of pixel units, the array of pixel units comprises N rows of pixel units, and N is an integer greater than or equal to 1; and forming a driving circuit, wherein forming the driving circuit comprises forming at least N rows of shifting units, an output signal of an i-th row of shifting unit is applied to control opening of an i-th row of pixel unit, and i is an integer greater than or equal to 1 and less than or equal to N;

wherein forming the driving circuit further comprises forming a first global clearing signal line, the first global clearing signal line is connected with a plurality of odd rows of shifting units respectively, and a signal in the first global clearing signal line is applied to trigger the plurality of odd rows of shifting units to simultaneously turn on a plurality of odd rows of pixel units, so that the plurality of odd rows of pixel units simultaneously discharge residual charge; and wherein forming the driving circuit further comprises forming a second global clearing signal line, the second global clearing signal line is connected with a plurality of even rows of shifting units respectively, and a signal in the second global clearing signal line is applied to trigger the plurality of even rows of shifting units to simultaneously turn on a plurality of even rows of pixel units, so that the plurality of even rows of pixel units simultaneously discharge residual charge.

* * * * *